United States Patent
Yu et al.

(10) Patent No.: US 10,073,319 B2
(45) Date of Patent: Sep. 11, 2018

(54) QAM VECTOR SIGNAL GENERATION BY EXTERNAL MODULATOR

(71) Applicant: ZTE Corporation, Shenzhen (CN)

(72) Inventors: Jianjun Yu, Basking Ridge, NJ (US); Xinying Li, Morristown, NJ (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/146,787

(22) Filed: May 4, 2016

(65) Prior Publication Data

US 2016/0329967 A1  Nov. 10, 2016

Related U.S. Application Data

(60) Provisional application No. 62/156,777, filed on May 4, 2015.

(51) Int. Cl.
*H04B 10/00* (2013.01)
*G02F 1/225* (2006.01)
*H04B 10/54* (2013.01)
*G02F 1/21* (2006.01)

(52) U.S. Cl.
CPC .......... *G02F 1/2255* (2013.01); *H04B 10/541* (2013.01); *G02F 2001/212* (2013.01)

(58) Field of Classification Search
CPC ............ H03M 13/255; H03M 13/1165; H04B 7/0469; H04B 7/0456; H04B 10/541; G02F 1/2255; G02F 2001/212
USPC ........................................................ 398/185
See application file for complete search history.

(56) References Cited

U.S. PATENT DOCUMENTS

| | | | | |
|---|---|---|---|---|
| 2004/0141222 A1* | 7/2004 | Miyazaki | .............. | G02F 1/0121 359/237 |
| 2007/0165566 A1* | 7/2007 | Khan | .................... | H04B 7/022 370/329 |
| 2010/0003933 A1* | 1/2010 | Sato | ........................ | H04B 3/54 455/108 |
| 2011/0158654 A1* | 6/2011 | Zhang | ................ | H04B 10/5053 398/158 |
| 2016/0315733 A1* | 10/2016 | Murakami | .............. | H04L 27/34 |

OTHER PUBLICATIONS

Chen, Y., et al., "Microwave vector signal transmission over an optical fiber based on IQ modulation and coherent detection," Optics Letters, 39(6):1509-1512, Mar. 2014.

Frejstrup Suhr, L., et al., "Direct modulation of 56 Gbps duobinary-4-PAM," Optical Fiber Communication Conference, Optical Society of America, Los Angeles, California, USA, Paper Th1E-7, 3 pages, Mar. 2015.

(Continued)

*Primary Examiner* — Don N Vo
(74) *Attorney, Agent, or Firm* — Perkins Coie LLP

(57) ABSTRACT

An optical signal transmitter produces optical signals comprising QAM modulated vector signals generated using a single external electro-optical modulator operated in conjunction with a wavelength selective switch. The transmission processing achieves adaptive photonic frequency multiplication and comprises QAM modulated signals with high order constellations such as 8-QAM, 16-QAM, 32-QAM and 64-QAM.

19 Claims, 18 Drawing Sheets

(56) References Cited

OTHER PUBLICATIONS

Jiang, W.-J., et al., "Photonic vector signal generation employing a novel optical direct-detection in-phase/quadrature-phase upconversion," Optics Letters, 35(23):4069-4071, Dec. 2010.
Li, R., et al., "Millimeter-Wave Vector Signal Generation Based on a Bi-Directional Use of a Polarization Modulator in a Sagnac Loop," Journal of Lightwave Technology, 33(1):251-257, Jan. 2015.
Li, W., et al., "Microwave Generation Based on Optical Domain Microwave Frequency Octupling," IEEE Photonics Technology Letters, 22(1):24-26, Jan. 2010.
Li, X., et al., "Photonic vector signal generation at W-band employing an optical frequency octupling scheme enabled by a single MZM," Optics Communications, 349:6-10, Aug. 2015.
Li, X., et al., "W-Band 8QAM Vector Signal Generation by MZM-Based Photonic Frequency Octupling," IEEE Photonics Technology Letters, 27(12)1257-1260, Jun. 2015.
Rodes, R., et al., "100 Gb/s Single VCSEL Data Transmission Link," Optical Fiber Communication Conference, OSA Technical Digest (Optical Society of America, 2012), Paper PDP5D.10, 3 pages, Los Angeles, California, USA, Mar. 2012.
Wang, K., et al., "A Radio-Over-Fiber Downstream Link Employing Carrier-Suppressed Modulation Scheme to Regenerate and Transmit Vector Signals," IEEE Photonics Technology Letters, 19(18):1365-1367, Sep. 2007.
Xiao, J., et al., "High-Frequency Photonic Vector Signal Generation Employing a Single Phase Modulator," IEEE Photonics Journal, 7(2):7101206(1-7), Apr. 2015.
Yu, J., et al., "Centralized Lightwave Radio-Over-Fiber System With Photonic Frequency Quadrupling for High-Frequency Millimeter-Wave Generation," IEEE Photonics Technology Letters, 19(19):1499-1501, Oct. 2007.
Yu, J., et al., "Optical Millimeter-Wave Generation or Up-Conversion Using External Modulators," IEEE Photonics Technology Letters, 18(1):265-267, Jan. 2006.
Yu, J., et al., "Ultra-High-Capacity DWDM Transmission System for 100G and Beyond," IEEE Communications Magazine, 48(3):556-564, Mar. 2010.
Zhang, J., et al., "A Photonic Microwave Frequency Quadrupler Using Two Cascaded Intensity Modulators With Repetitious Optical Carrier Suppression," IEEE Photonics Technology Letters, 19(14):1057-1059, Jul. 2007.
Zhou, X., et al., "Multi-Level, Multi-Dimensional Coding for High-Speed and High-Spectral-Efficiency Optical Transmission," Journal of Lightwave Technology, 27(16):3641-3653, Aug. 2009.
Cartledge, J.C., et al., "100 Gbit/s Using Intensity Modulation and Direct Detection," European Conference on Optical Communication (ECOC), London, UK, Paper We.4.C.3, 3 pages, Sep. 2013.
Chagnon, M., et al., "1 λ, 6 bits/symbol, 280 and 350 Gb/s Direct Detection Transceiver using Intensity Modulation, Polarization Multiplexing, and Inter-Polarization Phase Modulation," Optical Fiber Communication Conference, Optical Society of America, Los Angeles, California, USA, Paper Th5B.2, 3 pages, Mar. 2015.
Karar, A.S., et al., "Generation and Detection of a 112-Gb/s Dual Polarization Signal Using a Directly Modulated Laser and Half-Cycle 16-QAM Nyquist-Subcarrier-Modulation," European Conference and Exhibition on Optical communication, OSA Technical Digest (online) (Optical Society of America, 2012), Amsterdam, Netherlands, Paper Th.3.A.4, 3 pages, Sep. 2012.
Li, F., et al., "Performance Comparison of DFT-Spread and Pre-Equalization for 8×244.2-Gb/s PDM-16QAM-OFDM," Journal of Lightwave Technology, 33(1):227-233, Jan. 2015.
Li, X., et al., "Fiber-wireless transmission system of 108-Gb/s data over 80 km fiber and 2×2 multiple-input multiple-output wireless links at 100 GHz W-band frequency," Optics Letters, 37(24):5106-5108, Dec. 2012.
Li, X., et al., "Fiber-Wireless-Fiber Link for 100-Gb/s PDM-QPSK Signal Transmission at W-Band," IEEE Photonics Technology Letters, 26(18):1825-1828, Sep. 2014.
Lin, C.-T., et al., "Photonic vector signal generation at microwave/millimeter-wave bands employing an optical frequency quadrupling scheme," Optics Letters, 34(14):2171-2173, Jul. 2009.
Yu, J., et al., "432-Gb/s PDM-16QAM Signal Wireless Delivery at W-band Using Optical and Antenna Polarization Multiplexing," European Conference on Optical Communication (ECOC), Cannes, France, Paper We.3.6.6, 3 pages, Sep. 2014.
Zhang, J. et al., "Simplified coherent receiver with heterodyne detection of eight-channel 50Gb/s PDM-QPSK WDM signal after 1040 km SMF-28 transmission," Optics Letters, 37(19):4050-4052, Oct. 2012.

* cited by examiner

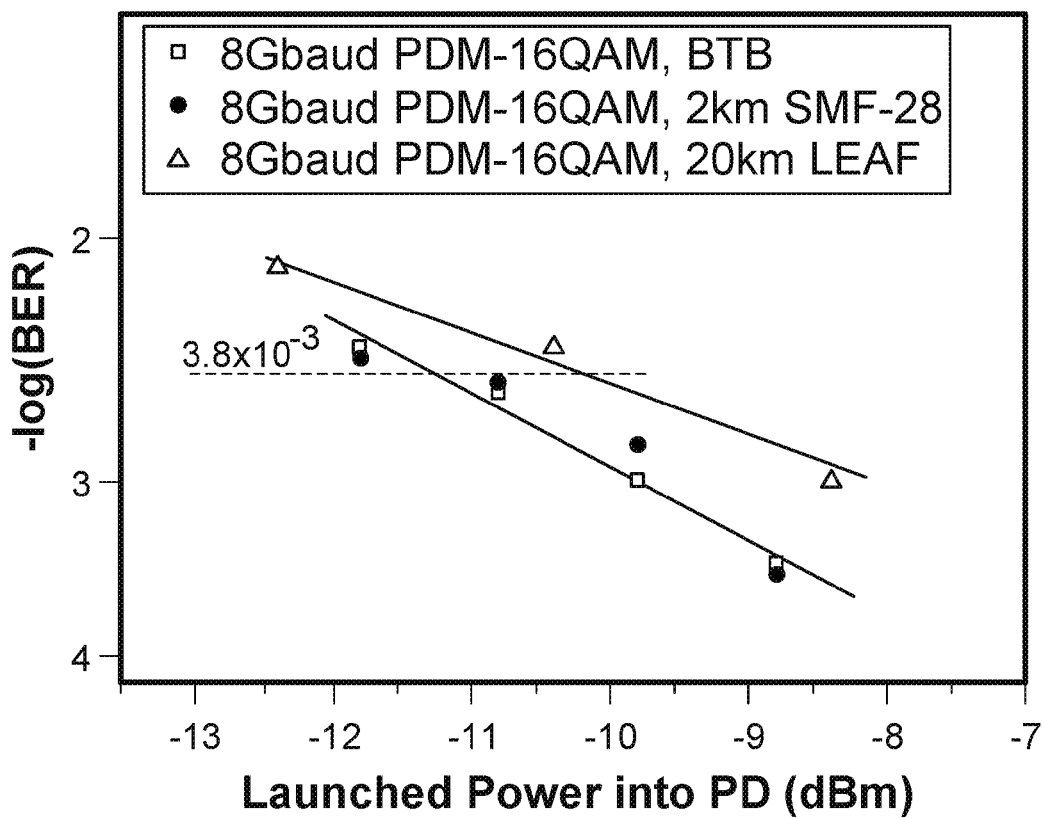
FIG. 16A
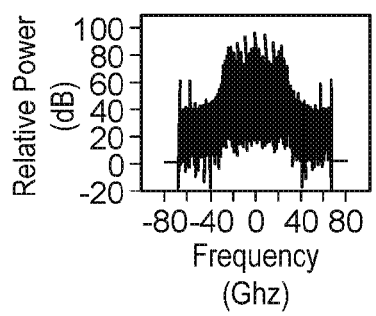 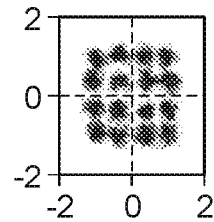 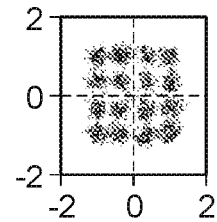
FIG. 16B     FIG. 16C     FIG. 16D

US 10,073,319 B2

QAM VECTOR SIGNAL GENERATION BY EXTERNAL MODULATOR

CROSS REFERENCE TO RELATED APPLICATIONS

This patent document claims the benefit of priority of U.S. Provisional Patent Application No. 62/156,777, filed on May 4, 2015. The entire content of the before-mentioned patent application is incorporated by reference as part of the disclosure of this document.

BACKGROUND

This patent document relates to digital communication, and, in one aspect, optical communication systems.

There is an ever-growing demand for data communication in application areas such as wireless communication, fiber optic communication and so on. The demand on core networks is especially higher because not only are user devices such as smartphones and computers using more and more bandwidth due to multimedia applications, but also the total number of devices for which data is carried over core networks is increasing. For profitability and to meet increasing demand, equipment manufacturers and network operators are continually looking for ways in which transmission bandwidth can be increased while operational and capital expenditure can be reduced.

SUMMARY

The present document discloses, among other things, techniques for generating modulated optical signals in which photonic frequency multiplexing is achieved by using a single external modulator to process a QAM (Quadrature Amplitude Modulation) vector signal in which high order QAM constellations are used.

In one example aspect, a method of optical communication implemented at a transmitter in an optical communication network, includes modulating information bits to be transferred using a multi-amplitude amplitude modulation scheme to produce modulated electrical in-phase and quadrature component signals, precoding the in-phase and quadrature component signals to mitigate distortions in a subsequence electrical to optical conversion stage, wherein the precoding modifies amplitudes of the component signals and phases of the component signals, and converting the precoded component signals using a single electro-optical modulator into a radio frequency (RF) optical signal comprising two component optical signals at two different subcarrier frequencies and with a suppressed carrier signal.

In another example aspect, an optical transmission apparatus includes a modulation circuit that modulates information bits to be transferred using a multi-amplitude amplitude modulation scheme to produce modulated electrical in-phase and quadrature component signals, a precoder that precodes the in-phase and quadrature component signals to mitigate distortions in a subsequence electrical to optical conversion stage, wherein the precoding modifies amplitudes of the component signals and phases of the component signals, and an electro-optical modulation stage that converts the precoded component signals using a single electro-optical modulator into a radio frequency (RF) optical signal comprising two component optical signals at two different subcarrier frequencies and with a suppressed carrier signal.

These and other aspects, and their implementations and variations are set forth in the drawings, the description and the claims.

BRIEF DESCRIPTION OF THE DRAWINGS

FIG. 7A shows output electrical waveform (50 ps/div) of AWG. FIG. 7B shows output optical spectra (0.02-nm resolution) of MZM. FIG. 7C shows an experimental arrangement that includes ECL: external cavity laser, MZM: Mach-Zehnder modulator, AWG: arbitrary waveform generator, EA: electrical amplifier, EDFA: erbium-doped fiber amplifier, PD: photodiode, OSC: oscilloscope.

FIG. 10C shows 6-GHz precoded vector signal spectrum. FIG. 10D shows output electrical waveform (25 ps/div) of AWG. FIG. 10E shows an experimental setup.

FIG. 14D shows 12-GHz precoded vector signal spectrum. FIG. 14E shows the experimental setup.

FIGS. 16A-16D show BER versus the launched optical power into PD.

DETAILED DESCRIPTION

To meet the increasing demand on high data communication bandwidth, developers are continuously looking for new ways by which to carry a greater number of data bits over existing communication infrastructure. In optical communication, data is transmitted over optical carriers, e.g., glass or plastic optical fibers by modulating using a variety of different techniques. Some techniques implement data modulation in the electrical domain, e.g., by processing electronic signals. Alternatively or in addition, data modulation can also be achieved in the optical domain, e.g., using photonic signal processing.

Figure 1:
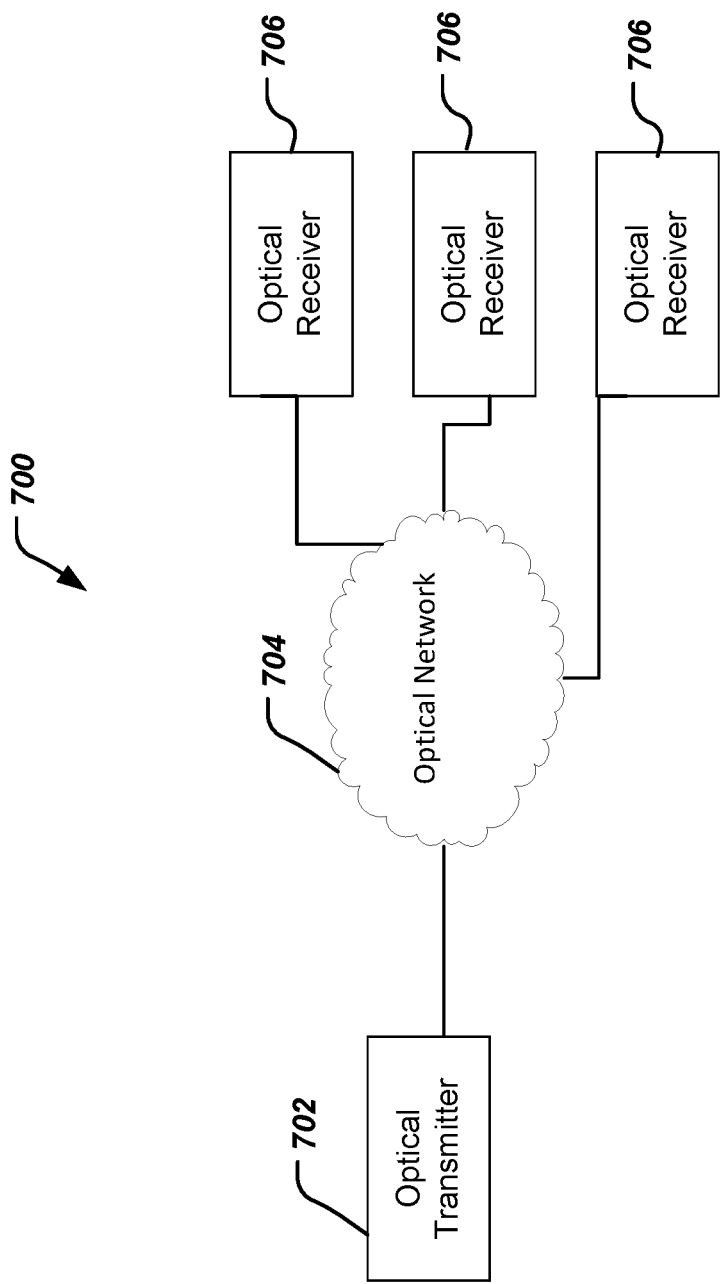
FIG. 1 shows an example optical communication network.

FIG. 1 depicts an optical communication system 700 in which the presently disclosed technology can be embodied. One or more optical transmitters 702 are communicatively coupled via an optical network 704 with one or more optical receivers 706. The optical network 704 may comprise optical fibers that extend in length from several hundred feet (e.g., last mile drop) to several thousands of kilometers (long haul networks). The transmitted optical signals may go through intermediate optical equipment such as amplifiers, repeaters, switch, etc., which are not shown in FIG. 1 for clarity.

In implementations that achieve data modulation using at least some processing in the optical domain, e.g., using intensity and/or phase of optical signals, a variety of operational channels have to be overcome to be able to achieve high data throughput. Various techniques have been disclosed herein for generating modulated optical signals, e.g., quadrature amplitude modulation (QAM) optical signals.

In some disclosed embodiments, photonic QAM vector signal generation at microwave/millimeter-wave (mm-wave) bands is enabled by a single Mach-Zehnder modulator (MZM) or a phase modulator and a phase-precoding technique, which can realize adaptive photonic frequency multiplication, such as doubling (×2), quadrupling (×4), sextupling (×6) and octupling (×8), of the precoded microwave vector signal used for the drive of the single MZM or optical phase modulator.

In a photonic vector modulator, two optical carriers, are modulated with two independent baseband data streams I and Q. The two optical signals can either be of the same source divided into two streams, or two different lasers, and the data modulation can be either direct current modulation of the lasers such as distributed feedback lasers (DFB) or external modulation using electro-optical modulators like Mach-Zehnder modulators (MZM).

In this document, headers are used for clarity of explanation are not intended to limit scope of the techniques to the header-captioned category only.

Techniques for Single Polarization QAM Vector Signal Generation by Optical Carrier Suppression and Precoding It is well known that the radio-over-fiber (RoF) technology has the advantages of large bandwidth, high mobility and low propagation loss, and has become a promising candidate in enabling carriage of future broadband wireless communication traffic over the supporting network backbone. Meanwhile, advanced vector signal modulation combined with digital coherent detection, for which data information can be encoded into both in-phase (I) and quadrature (Q) components of a carrier, can efficiently improve receiver sensitivity and system spectral efficiency. Thus, the introduction of advanced vector signal modulation into RoF systems can overcome the limitation of insufficient spectrum resources and significantly increase wireless transmission rate. In the past few years, numerous techniques have been proposed to implement RoF systems which can generate and transmit radio-frequency (RF) carrier employing advanced vector signal modulation. The technique of external intensity modulation makes use of the beating of the sidebands generated by external intensity modulator driven by a radio-frequency (RF) signal, and can provide RoF systems with very stable RF carrier, the frequency of which only depends on the driving RF signal. Moreover, external intensity modulation combined with photonic frequency multiplication can realize high-frequency RF signal generation with the reduced bandwidth requirement for both optical and electrical components at the transmitter end. One prior art implementation used photonic vector signal generation at RF bands employing dual-parallel Mach-Zehnder modulator (MZM)-based photonic frequency quadrupling and precoding techniques. Relative to one intensity modulator, a dual-parallel MZM is more expensive and also more complicated to control. Moreover, the generated vector signal is constant-amplitude quadrature-phase-shift-keying (QPSK) modulated, and no higher-order multi-amplitude modulation, such as 8-ary quadrature-amplitude-modulation (8QAM) and 16-ary quadrature-amplitude-modulation (16QAM), is considered in that work. Thus, it is interesting to investigate how to realize higher-order multi-amplitude QAM modulated vector signal generation at RF bands based on only one modulator with a simple architecture (no cascaded or dual-parallel modulators) and a high stability.

In this document, we disclose photonic constant- and multi-amplitude QAM vector signal generation at RF bands enabled by MZM-based optical carrier suppression (OCS) modulation. In order to attain an electrical vector RF signal displaying multi-amplitude QAM modulation, such as 8QAM and 16QAM, the driving RF signal, carrying multi-amplitude QAM transmitter data, should be both amplitude- and phase-precoded before used to drive the MZM. However, for constant-amplitude QAM modulation, such as QPSK, only phase precoding is needed. Experiments have demonstrated 1-Gbaud QPSK/8QAM/16QAM vector signal generation at 12 GHz adopting OCS-enabled photonic frequency doubling. The MZM used for OCS modulation is driven by a 6-GHz precoded RF signal carrying 1-Gbaud QPSK/8QAM/16QAM transmitter data. In one advantageous aspect, some embodiments include the generation and reception of higher-order 8QAM and 16QAM vector signal by one external modulator at RF bands.

Principle of Multi-Amplitude QAM Vector Signal Generation at RF Bands

Figures 4A, 4B:
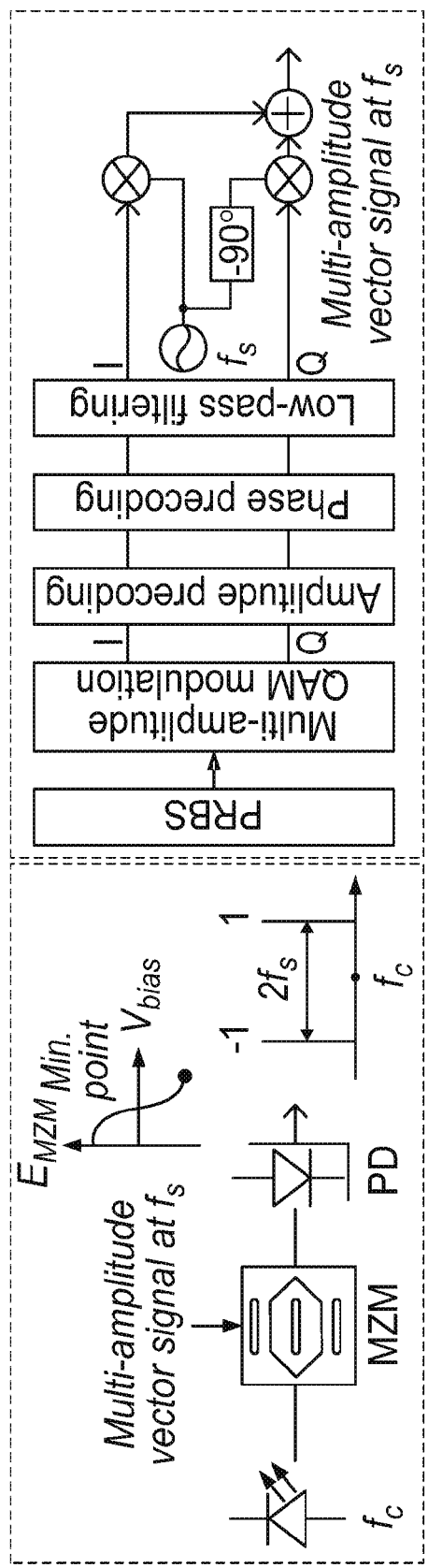
FIGS. 4A-4B show an example of (4A) principle of photonic vector signal generation at RF bands, and (4B) vector-modulated precoded RF signal generation (MZM: Mach-Zehnder modulator, PD: photodiode).

FIG. 4A shows the schematic diagram of example photonic multi-amplitude (e.g., constellation symbols having different amplitude levels, e.g., 8 or higher) QAM vector signal generation at RF bands, using OCS modulation enabled by a single MZM. As shown in FIG. 4A, the continuous wave (CW) output, at frequency $f_c$, from a laser, is modulated by an RF carrier at frequency $f_s$, which carries a multi-amplitude QAM data and drives the MZM. Assume that the CW output at frequency $f_c$ and the driving RF signal at frequency $f_s$ can be respectively expressed as $$E_{CW}(t)=K_1\exp(j2\pi f_c t). \qquad \text{Eq. (1)}$$

$$E_{RF}(t)=K_2(t)\sin[2\pi f_s t+\varphi(t)]. \qquad \text{Eq. (2)}$$

where $K_1$ is constant and denotes the amplitude of the CW output at frequency $f_c$. $K_2$ and $\varphi$ denote the amplitude and phase of the driving RF signal at frequency $f_s$, respectively. $K_2$ is invariant with time when the transmitter data adopts constant-amplitude vector modulation, such as QPSK, and has several different values when the transmitter data adopts multi-amplitude vector modulation, such as 8QAM and 16QAM. Thus, when the MZM is biased at its minimum transmission point to realize OCS modulation, its output can be expressed as $$E_{MZM}(t)\approx 2jK_1\{J_{-1}(\kappa)\exp[j2\pi(f_c-f_s)t-j\varphi(t)]+J_{+1}(\kappa)\exp[j2\pi(f_c+f_s)t+j\varphi(t)]\}. \qquad \text{Eq. (3)}$$

where $J_n$ is the Bessel function of the first kind and order n. K is equal to $\pi V_{drive}K_2 0/V_\pi$, while $V_{drive}$ and $V_\pi$ denote driving voltage and half-wave voltage of the MZM, respectively. We can see from Eq. (3) that two first-order subcarriers spaced by $2f_s$ are generated by the MZM biased at its minimum transmission point, as shown by the inset of FIG. 4A.

When the two generated first-order subcarriers are heterodyne mixed in a PD, the leading term of the generated RF current after the PD is given by $$i_{RF}(t) = \frac{1}{2} R J_1^2(\kappa) \cos[2\pi \cdot 2f_s t + 2\varphi(t)]. \qquad \text{Eq. (4)}$$

where R denotes the PD sensitivity. We can see from Eq. (4) that the frequency $2f_s$ of the obtained RF signal is double of the driving RF signal ($f_s$).

Therefore, we can realize photonic frequency doubling of the driving RF signal based on our proposed scheme as shown in FIG. 4A, which, in the meantime, can reduce the bandwidth requirement for photonic and electronic components at the transmitter end. However, it is realized that in our proposed scheme, after square-law PD conversion, frequency doubling also simultaneously leads to phase doubling. Moreover, the amplitude information of the driving RF signal is carried by the term of the square of $J_1(\kappa)$, which depends on the ratio of $V_{drive}$ to $V_\pi$. In order to directly attain the amplitude information and phase information of the multi-amplitude QAM transmitter data after PD conversion, the amplitude $K_2$ and phase $\varphi$ of the driving RF signal should satisfy $$K_{data} = J_1^2(\pi K_2 V_{drive}/V_\pi); \varphi_{data} = 2\varphi. \qquad \text{Eq. (5)}$$

where $K_{data}$ and $\varphi_{data}$ denote the amplitude and phase of the original transmitter data, respectively. Therefore, the amplitude and phase of the driving RF signal needs to be precoded at the transmitter end. For a known multi-amplitude QAM transmitter data, the obtained values of $K_2$ and $\varphi$ by resolving Eq. (5) are just the precoded amplitude and phase which can be assigned to the driving RF signal. FIG. 4B shows the generation procedure of driving precoded RF signal at frequency $f_s$ carrying multi-amplitude QAM data, which can be implemented by MATLAB programming. Here, the pseudo random binary sequence (PRBS) is first multi-amplitude QAM modulated, then amplitude- and phase-precoded, and finally up-converted into RF band by simultaneous cosine and sine functions. Note that when the transmitter data adopts constant-amplitude vector modulation, such as QPSK, only phase precoding is needed. However, when the transmitter data adopts multi-amplitude vector modulation, such as 8QAM and 16QAM, both phase and amplitude precoding are required.

In some embodiments, a 6-GHz precoded RF signal carrying 1-Gbaud vector-modulated transmitter data is generated by MATLAB programming (for testing) or could be actual user data during operation, and then uploaded into an arbitrary waveform generator (AWG) with 64-GSa/s sampling rate to drive the MZM biased at its minimum transmission point. The transmitter data can be QPSK, 8QAM or 16QAM modulated. According to Eq. (5), the phase of the 6-GHz precoded RF signal is ½ of that of the regular QPSK/8QAM/16QAM symbol, while its amplitude depends on the amplitude of the regular QPSK/8QAM/16QAM symbol and the ratio of $V_{drive}$ to $V_\pi$.

Figure 5A:
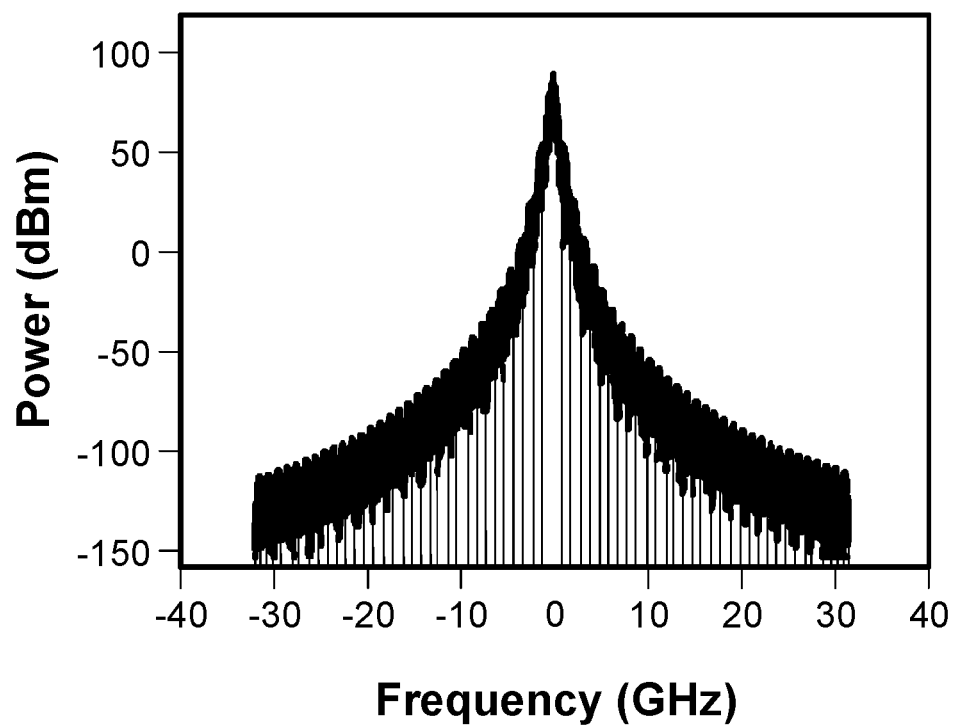
FIGS. 5A-5B show an example of transmitter spectra (5A) before and (5B) after up-conversion.
Figure 5B:
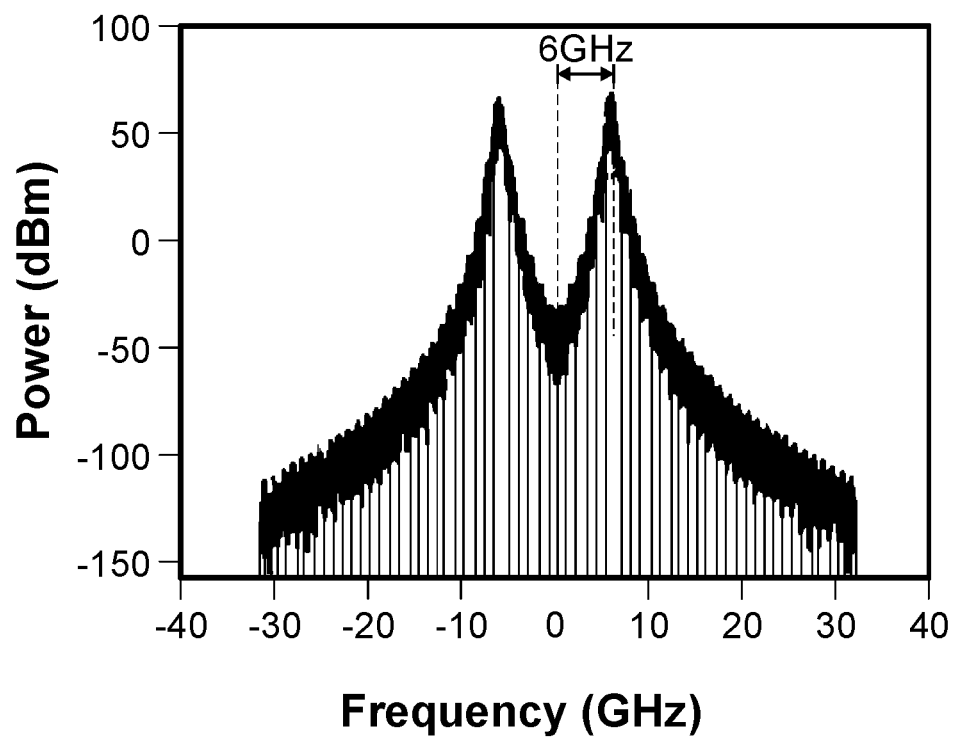
Figure 6:
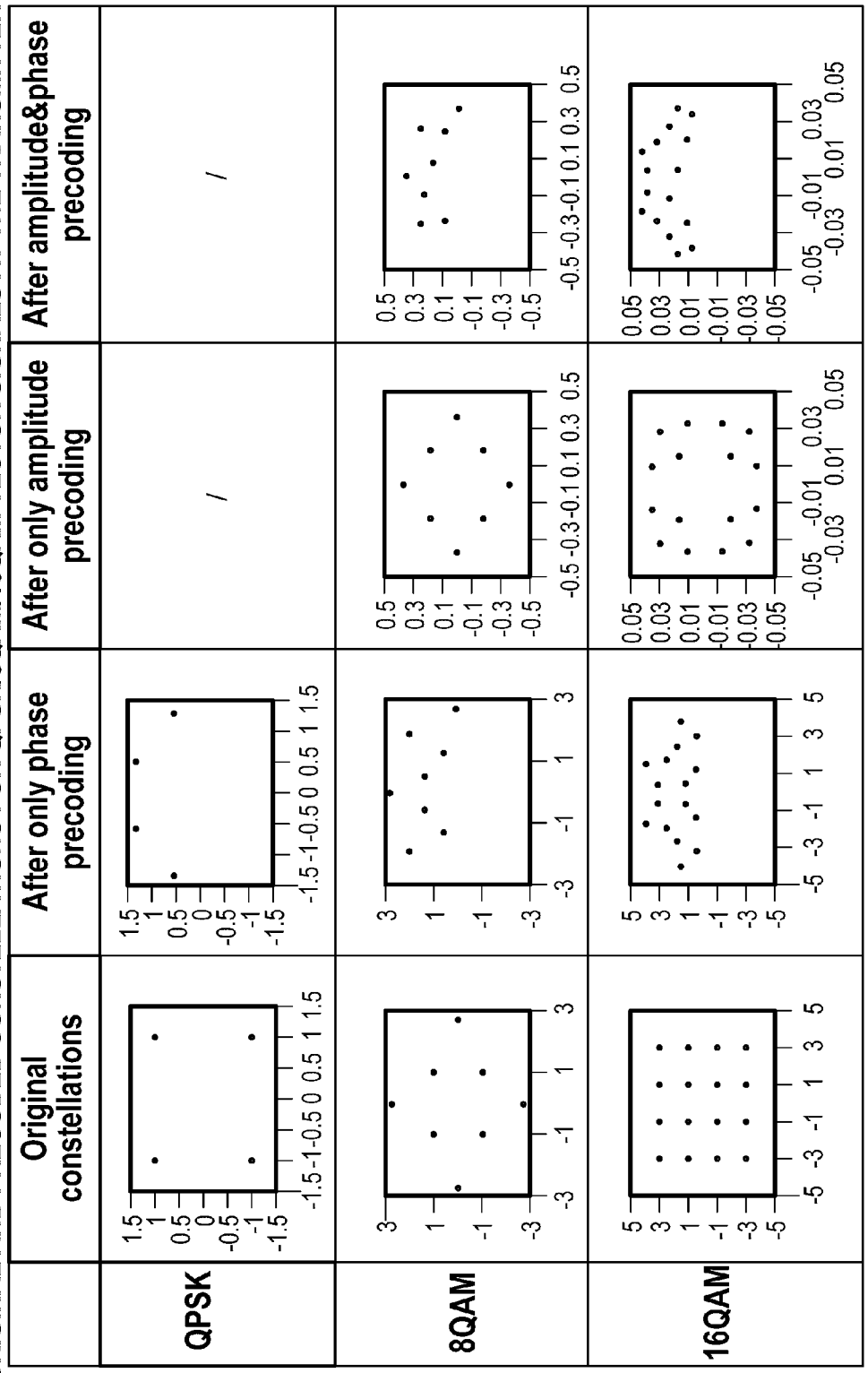
FIG. 6 shows original and precoded constellations for QPSK/8QAM/16QAM vector signals at the transmitter.

According to the transmitter MATLAB programming, FIG. 6 the calculated original constellations as well as the calculated constellations after only phase precoding, after only amplitude precoding and after both amplitude and phase precoding for the 1-Gbaud QPSK/8QAM/16QAM signals, respectively. For both 8QAM and 16QAM cases, the order of amplitude precoding and phase precoding can be exchanged, and the ratio of $V_{drive}$ to $V_\pi$ is set at 3 for the MATLAB-based amplitude precoding. FIGS. 5A and 5B show the transmitter spectra before and after 6-GHz up-conversion for the QPSK cases, and both the 8QAM and 16QAM cases have quite similar transmitter spectra, which are not shown in this document.

Figure 7A:
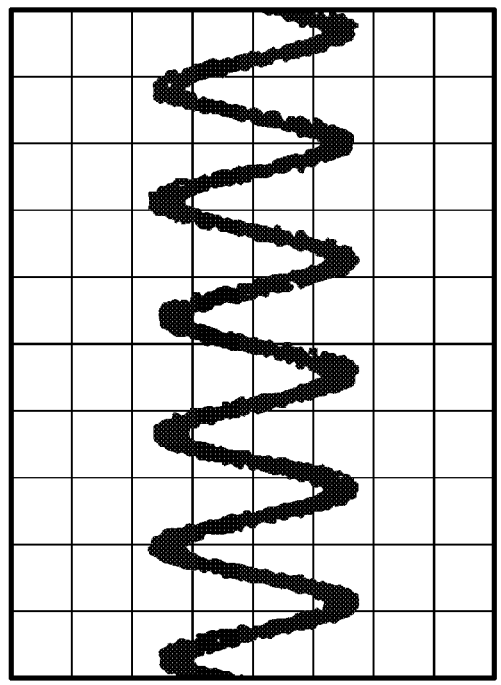
FIGS. 7A-7C show an experimental setup.
Figure 7B:
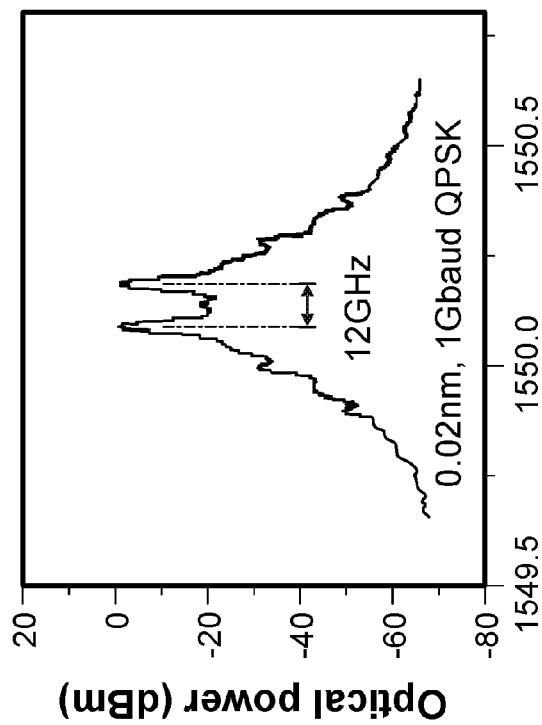
Figure 7C:
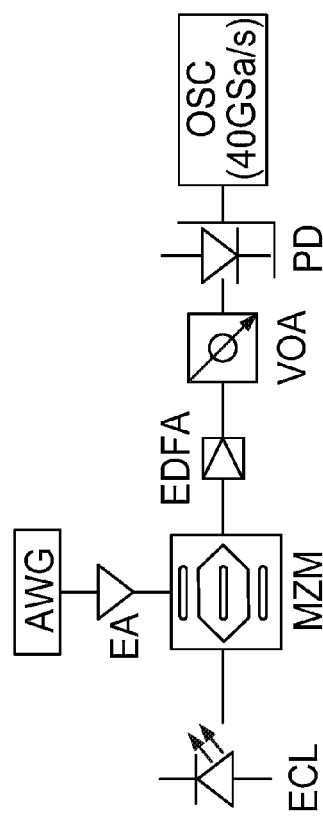

FIGS. 7A-7C show the experimental setup for multi-amplitude QAM vector signal generation at 12 GHz adopting MZM-based OCS modulation and precoding techniques. The CW output from an external cavity laser (ECL) is modulated by the aforementioned 6-GHz precoded RF signal via a MZM. The 6-GHz precoded RF signal carries $2^{15}$ QAM symbols and is boosted by an electrical amplifier (EA) to ~20 dBm to drive the MZM. The MZM has a 3-dB bandwidth of ~36 GHz, 2.8-V half-wave voltage ($V_\pi$) at 1 GHz and 5-dB insertion loss. The MZM is biased at its minimum transmission point to realize OCS modulation. An erbium-doped fiber amplifier (EDFA) is then used to compensate for modulation loss and insertion loss. For the case of 1-Gbaud QPSK, FIG. 7A gives the output electrical waveform (50 ps/div) of the AWG, while FIG. 7B gives the output optical spectrum (0.02-nm resolution) of the MZM, showing that two first-order optical subcarriers are generated with 12-GHz frequency spacing after OCS modulation. These two generated first-order optical subcarriers have the same amplitude but carry opposite phase information. The cases of 1-Gbaud 8QAM and 16QAM signals have quite similar electrical waveform and optical spectrum, which are not shown in this document.

Next, after passing through a variable optical attenuator (VOA), the 12-GHz QAM modulated optical RF signal is converted by a PD into a 12-GHz QAM modulated electrical RF signal, which is then captured by a digital oscilloscope (OSC) with 40-GSa/s sampling rate and 16-GHz electrical bandwidth. The QAM modulated transmitter data can be recovered from the 12-GHz electrical RF signal after offline digital signal processing (DSP), which includes IF down conversion, constant modulus algorithm (CMA) equalization for QPSK modulation or cascaded multi-modulus algorithm (CMMA) equalization for 8QAM/16QAM modulation, frequency offset estimation (FOE), and carrier phase estimation (CPE). Note that in our experiment, for the 8QAM/16QAM cases, the practical ratio of $V_{drive}$ to $V_\pi$ of the MZM may deviate from that set in the MATLAB-based amplitude precoding in some degree and thus affect the detected amplitude information after the PD, which, however, can be compensated by CMMA equalization at the receiver.

Figure 8:
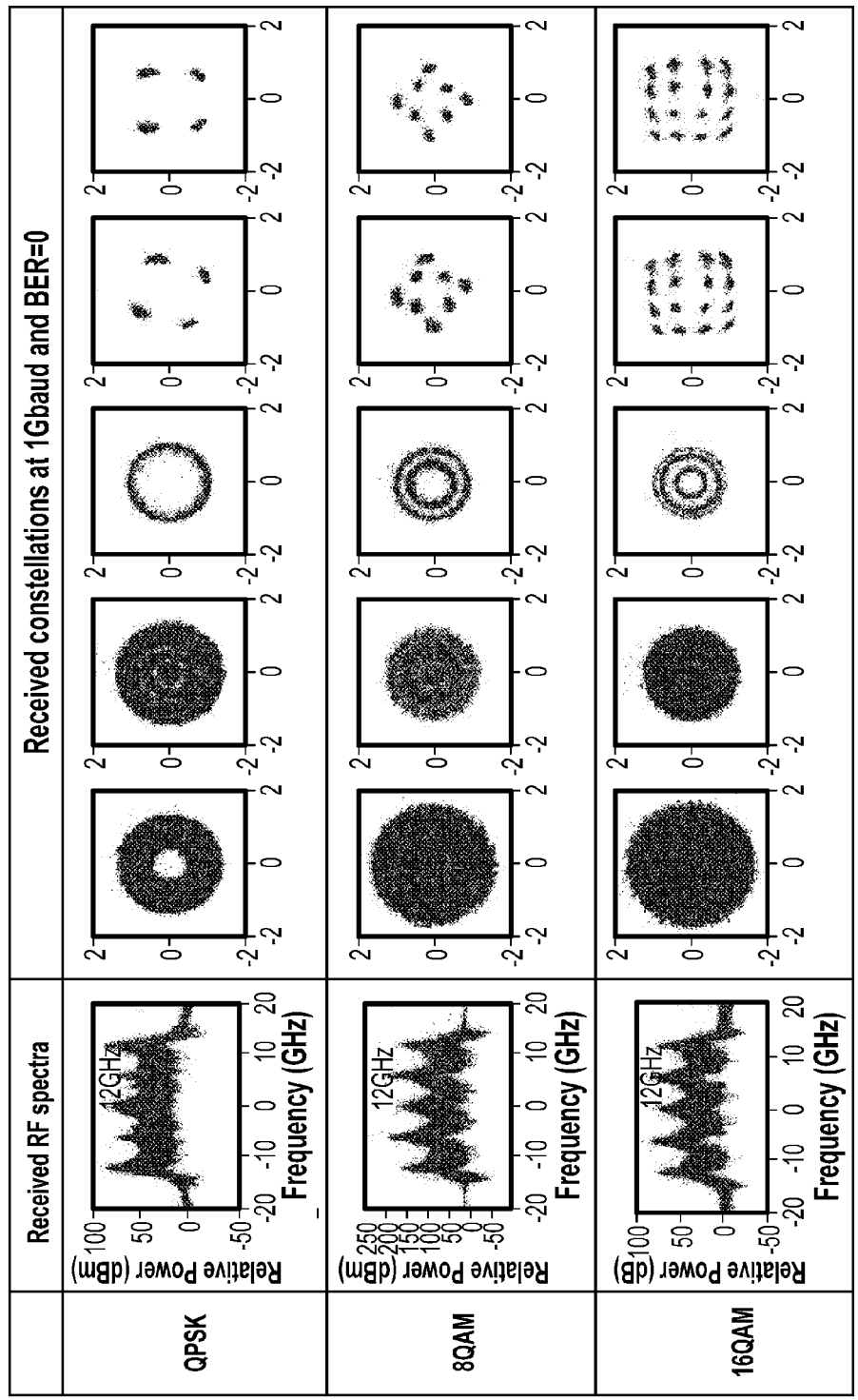
FIG. 8 shows received RF spectra and constellations for QPSK/8QAM/16QAM vector signals at the receiver.

FIG. 8 gives the received 12-GHz RF spectra and constellations for the 1-Gbaud QPSK/8QAM/16QAM vector signals, respectively. The launched optical power into the PD is −10, −8, and −2 dBm for the 1-Gbaud QPSK/8QAM/16QAM vector signals, respectively. The BERs are all zero for these three cases. For each case, the constellations from left to right in Table II correspond to those before clock extraction, after clock extraction, after CMA/CMMA equalization, after FOE and after CPE, respectively.

Figure 9:
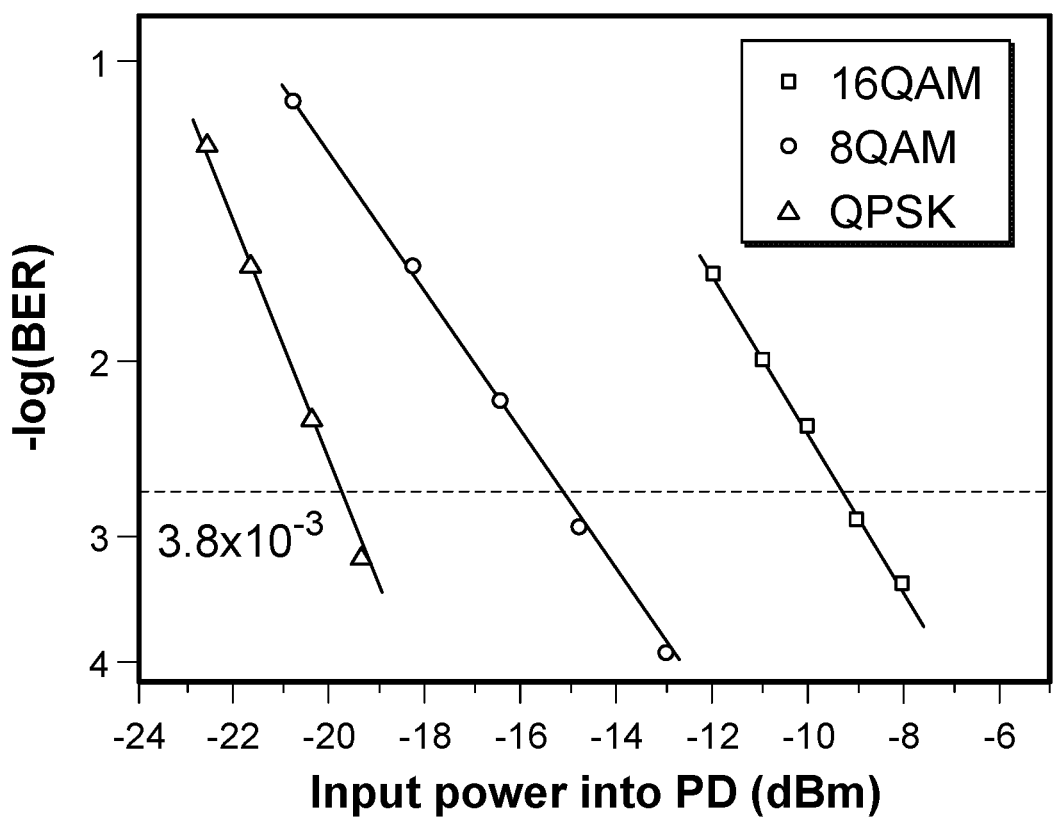
FIG. 9 shows measured BER versus the launched optical power into PD for 1-Gbaud QPSK/8QAM/16QAM vector signals.

FIG. 9 shows the measured bit-error-ratio (BER) performance versus the launched optical power into PD for the 1-Gbaud QPSK/8QAM/16QAM vector signals, respectively. The BER can reach the hard-decision forward-error-correction (HD-FEC) threshold of $3.8 \times 10^{-3}$ for all three cases. At the HD-FEC threshold of $3.8 \times 10^{-3}$, the OSNR requirement for 8QAM and 16QAM is 5-dB and 11-dB higher than that for QPSK, respectively. It is because higher-order modulation formats require higher receiver sensitivity.

It will be appreciated that results that demonstrate photonic constant- and multi-amplitude QAM vector signal generation at RF bands enabled by MZM-based OSC modulation and precoding techniques have been disclosed. Some embodiments achieve the generation of 1-Gbaud vector signal at 12 GHz, adopting QPSK, 8QAM and 16QAM modulation, respectively. The MZM is driven by a 6-GHz precoded RF signal carrying 1-Gbaud QPSK/8QAM/16QAM transmitter data, and biased at its minimum transmission point to realize OCS modulation. The phase of the precoded RF signal is ½ of that of the regular QPSK/8QAM/16QAM symbol, while its amplitude depends on the amplitude of the regular QPSK/8QAM/16QAM symbol and the ratio of driving voltage to half-wave voltage of the MZM.

Techniques for Dual-Polarization QAM Vector Signal Generation by Optical Carrier Suppression and Precoding, in which, QPSK Signals are Used for Transmission The high-speed short-reach optical fiber systems are required to satisfy the ever increasing bandwidth demands in recent years. It is well known that intensity modulation and direction detection (IM-DD) is more practical for short-reach optical fiber systems than coherent detection in terms of cost and complexity. Meanwhile, advanced vector signal modulation combined with digital signal processing (DSP), for which data information is encoded into both in-phase (I) and quadrature (Q) components of a carrier, has gained increasing interest from the research community as a method to efficiently improve receiver sensitivity and system spectral efficiency. Moreover, the optical polarization multiplexing technique is a practical solution for the future spectrally-efficient high-speed optical transmission to double the capacity of a fiber link. Some prior art techniques use a relatively simple method to generate PDM-16QAM vector signal based on directly modulated laser and direct detection. However, this method is polarization sensitive, and a polarization tracking system is needed at the receiver to realize polarization de-multiplexing. The inventors have previously disclosed QPSK and 8QAM modulated vector signal generation at W-band based on IM-DD enabled photonic frequency octupling and precoding techniques. However, those embodiments adopt only one optical polarization. Some embodiments disclosed herein provide an answer for how to realize polarization multiplexing vector signal generation with a simple architecture and a high stability.

This document discloses polarization-division-multiplexing quadrature-phase-shift-keying (PDM-QPSK) modulated vector signal generation adopting MZM-based optical-carrier-suppression (OCS) intensity modulation and direct detection. The MZM is driven by a 6-GHz precoded vector signal carrying 2-Gbaud QPSK transmitter data, and biased at its minimum transmission point to realize OCS modulation. The phase of the 6-GHz precoded vector signal is ½ of that of the regular QPSK symbol. Only one polarization beam splitter (PBS) is needed to implement optical polarization diversity. The bit-error rate (BER) for the 2-Gbaud PDM-QPSK modulated vector signal can reach the hard-decision forward-error-correction (HD-FEC) threshold of $3.8 \times 10^{-3}$ after 80-km single-mode fiber-28 (SMF-28) transmission in the presence of optical dispersion compensation, and 80-km SMF-28 transmission causes no power penalty.

Figure 10A:
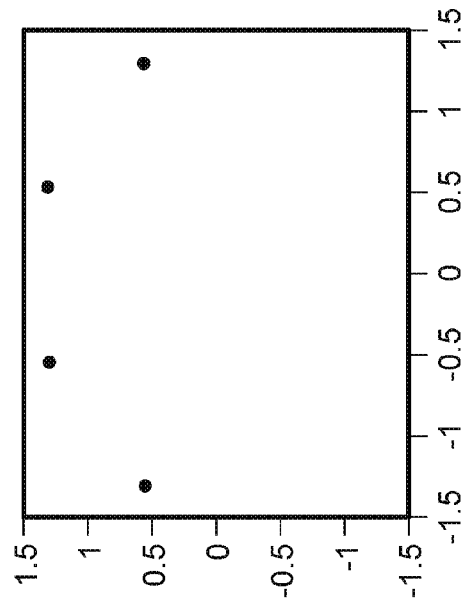
FIGS. 10A-10E show an experimental setup. Transmitter QPSK constellations (FIG. 10A) before and (FIG. 10B) after phase precoding are shown.
Figure 10B:
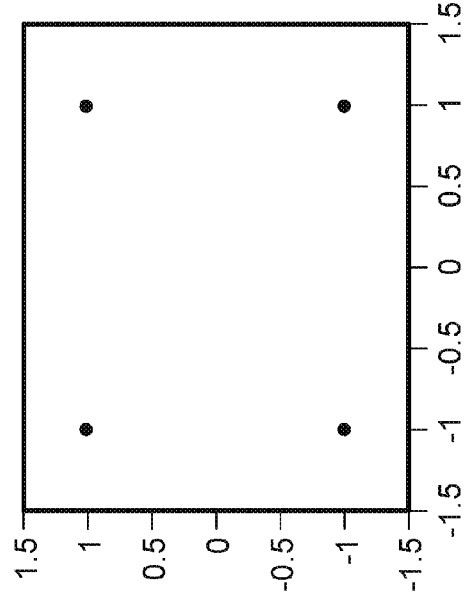
Figure 10C:
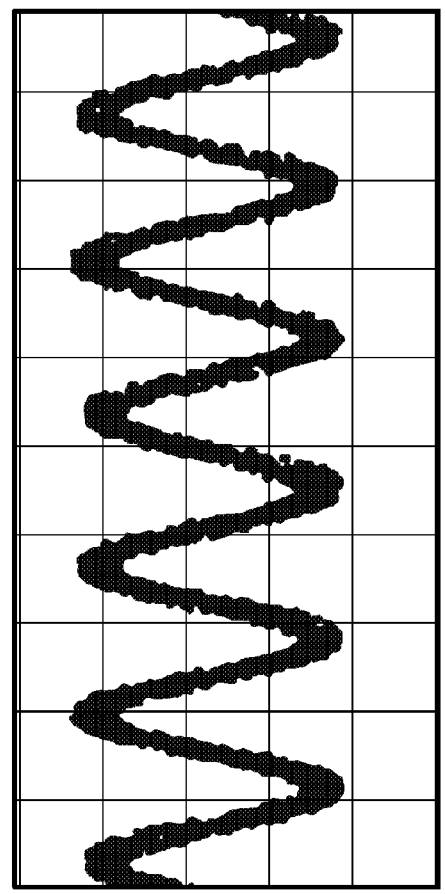
Figure 10D:
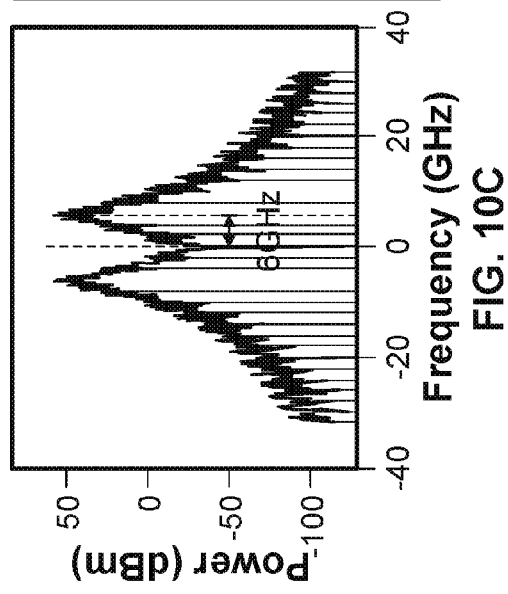

FIGS. 10A-10E show the experimental setup for PDM-QPSK modulated vector signal generation adopting MZM-based OCS intensity modulation and direct detection. At the transmitter, a precoded vector signal at 6 GHz, carrying 2- or 4-Gbaud QPSK data, is generated by MATLAB programming. That is, a pseudo random binary sequence (PRBS), with a length of $2^{10}$, is first QPSK mapped, then phase-precoded, and finally up-converted into 6-GHz RF band by simultaneous cosine and sine functions. FIGS. 10A and 10B show the calculated constellations after QPSK mapping and phase precoding, respectively. We can see that the precoded phase is ½ of that of the regular QPSK symbol. FIG. 10C gives the calculated 6-GHz precoded vector signal spectrum after up-conversion. Then, the generated 6-GHz precoded vector signal by MATLAB programming is uploaded into an arbitrary waveform generator (AWG) with 64-GSa/s sampling rate and 13-GHz electrical bandwidth to implement digital-to-analog conversion (DAC). FIG. 10D gives the output electrical waveform (25 ps/div) of the AWG. Note that FIGS. 10A-10D are all calculated or measured at 2 Gbaud.

Figure 11A:
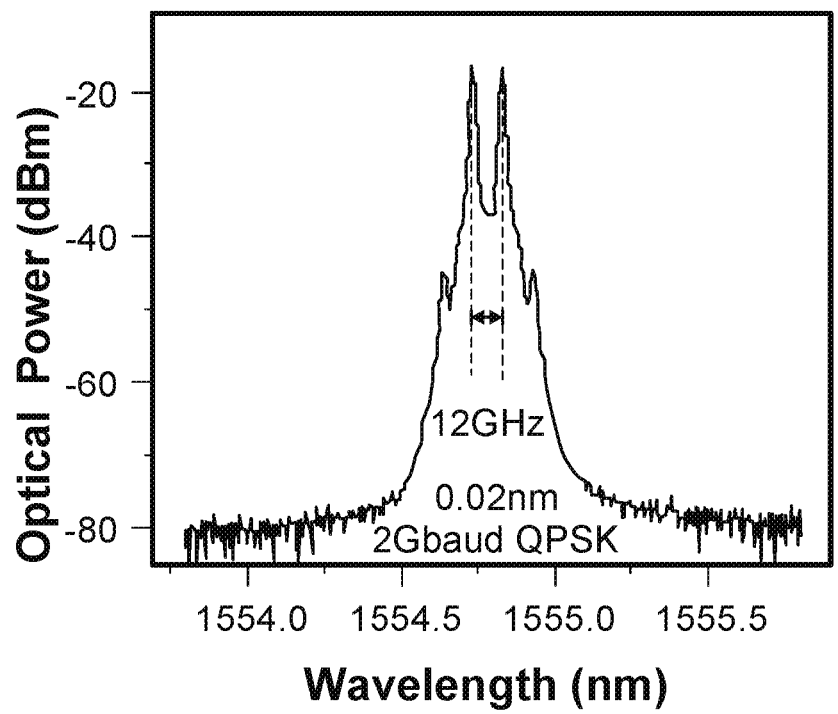
FIGS. 11A-11B show (FIG. 11A) output optical spectrum (0.02-nm resolution) of the MZM, and (FIG. 11B) received 12-GHz vector signal spectrum.

Next, after boosted by an electrical amplifier (EA) to ~6 $V_{pp}$ ($V_{pp}$ denotes the peak-to-peak voltage), the 6-GHz precoded vector signal is used to modulate the continuous-wave (CW) output from an external cavity laser (ECL) via a MZM. The MZM has a 3-dB bandwidth of ~36 GHz, 2.8-V half-wave voltage ($V_\pi$) at 1 GHz and 5-dB insertion loss. The MZM is biased at its minimum transmission point to realize OCS modulation. FIG. 11A gives the output optical spectrum (0.02-nm resolution) of the MZM at 2 Gbaud. We can see that two first-order optical subcarriers are generated with 12-GHz frequency spacing after OCS modulation. These two generated first-order optical subcarriers have the same amplitude but carry opposite phase information. Polarization multiplexing is further implemented by a polarization multiplexer, which includes a polarization-maintaining optical coupler (PM-OC) to split the signal into two components, a variable optical delay line to provide a delay of 90 symbols, a variable optical attenuator (VOA) to balance the power of the two components and a polarization beam combiner (PBC) to recombine the two components.

Then, the optical signal with 0-dBm launched power is first sent into a span of dispersion-compensating fiber (DCF) in cascade with an erbium-doped fiber amplifier (EDFA), and then a span of 80-km SMF-28 in cascade with an EDFA. The DCF, with 6-dB insertion loss, is used to implement optical full-dispersion compensation for 80-km SMF-28. The SMF-28 has 18-dB average loss and 17-ps/km/nm CD at 1550 nm. A VOA is added to adjust the optical power for BER measurement.

Figure 10E:
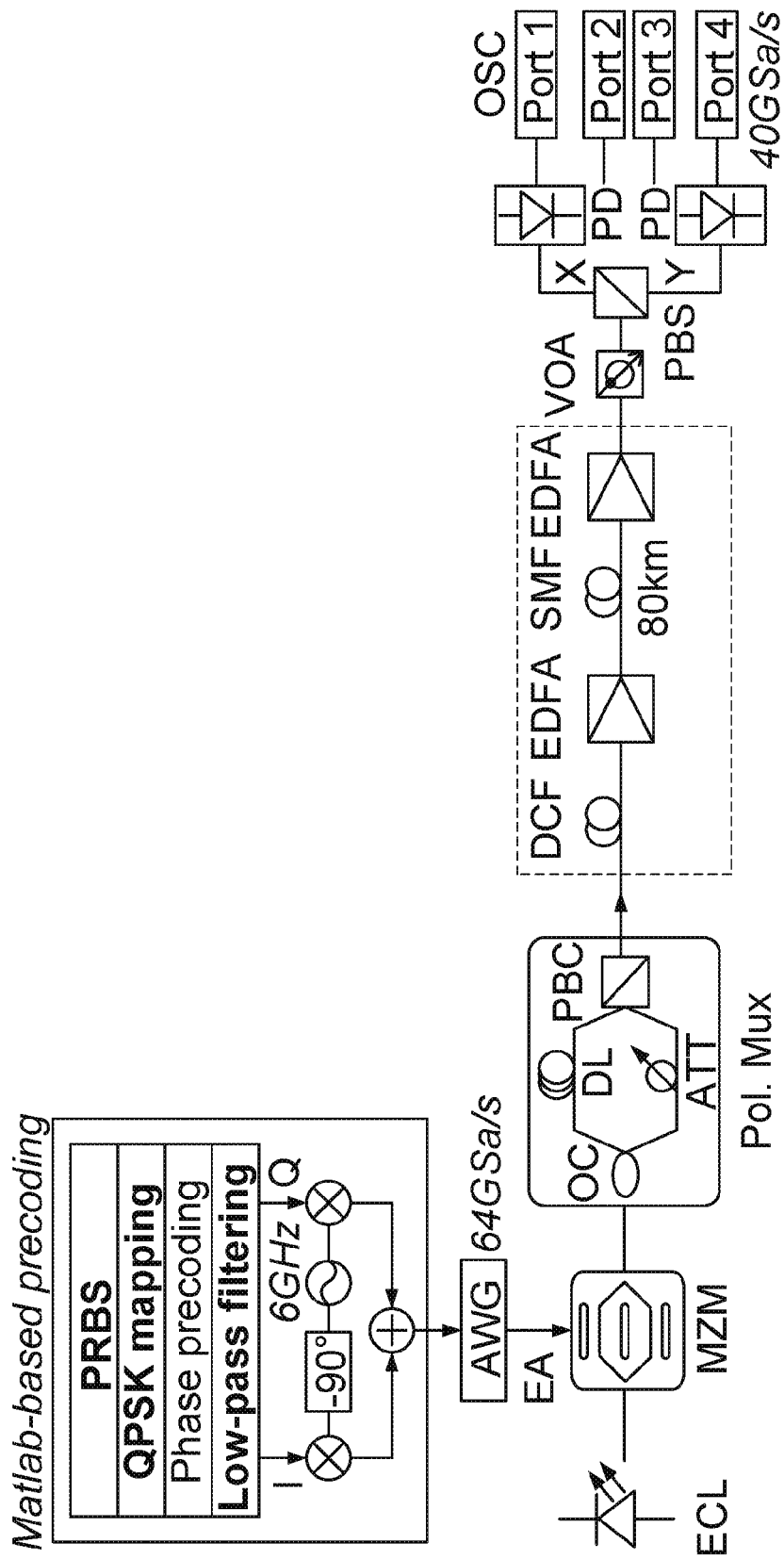
Figure 11B:
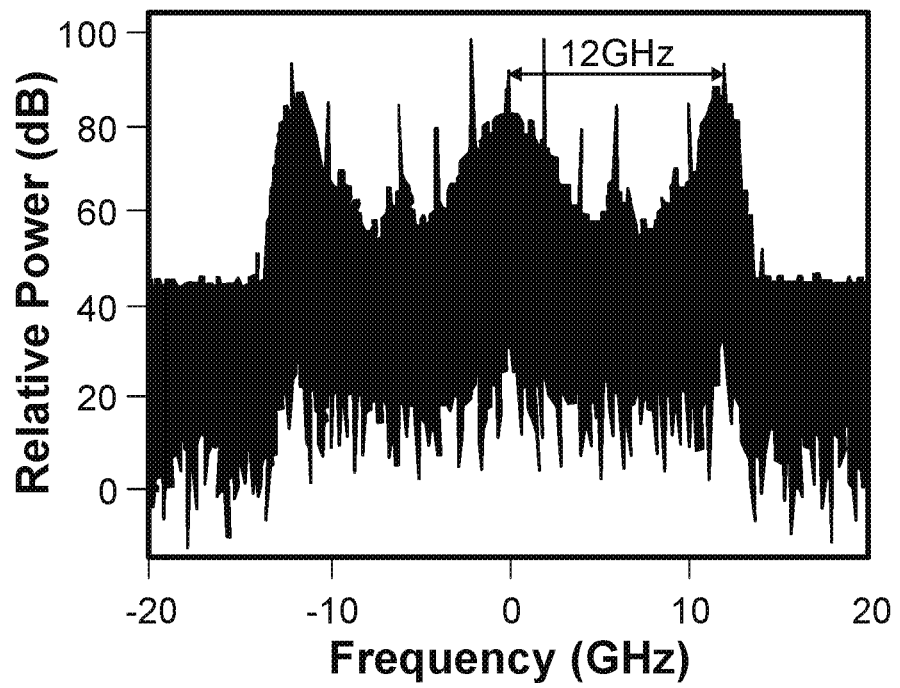

At the receiver, a PBS is first used to implement optical polarization diversity of the received optical signal. Then, the obtained X- and Y-polarization optical components are up-converted by two parallel photo detectors (PDs) into two 12-GHz electrical RF signals, which are simultaneously captured by two analog-to-digital-conversion (ADC) channels of a four-channel digital oscilloscope (OSC). The PD has 15-GHz optical bandwidth. Each ADC channel of the digital OSC has 40-GSa/s sampling rate and 16-GHz electrical bandwidth. Here, it is worth noting that, after square-law PD conversion, the doubling of the driving frequency of the MZM (from 6 GHz to 12 GHz) also leads to the doubling of the driving phase of the MZM at the same time. However, due to the adoption of phase precoding at the transmitter, the two 12-GHz electrical RF signals directly attained after PD conversion can display regular QPSK modulation. It is also worth noting that the polarization of the light in front of the PBS in FIG. 10E is arbitrary due to the fiber transmission. Thus, the X- or Y-polarization component at the output port of the PBS contains a mix of the data which is simultaneously encoded on the X- and Y-polarization at the transmitter. FIG. 11B gives the electrical spectrum of the 12-GHz 2-Gbaud electrical RF signal at X-polarization after ADC.

From FIG. 11B we can see that a part of components at high frequency are cut due to the bandwidth limitation of ADC. The transmitter QPSK data can be recovered from the two 12-GHz electrical RF signals after offline digital signal processing (DSP), which includes intermediate-frequency (IF) down conversion, constant modulus algorithm (CMA) equalization, frequency offset estimation, carrier phase estimation, differential decoding and BER counting.

Figure 12A:
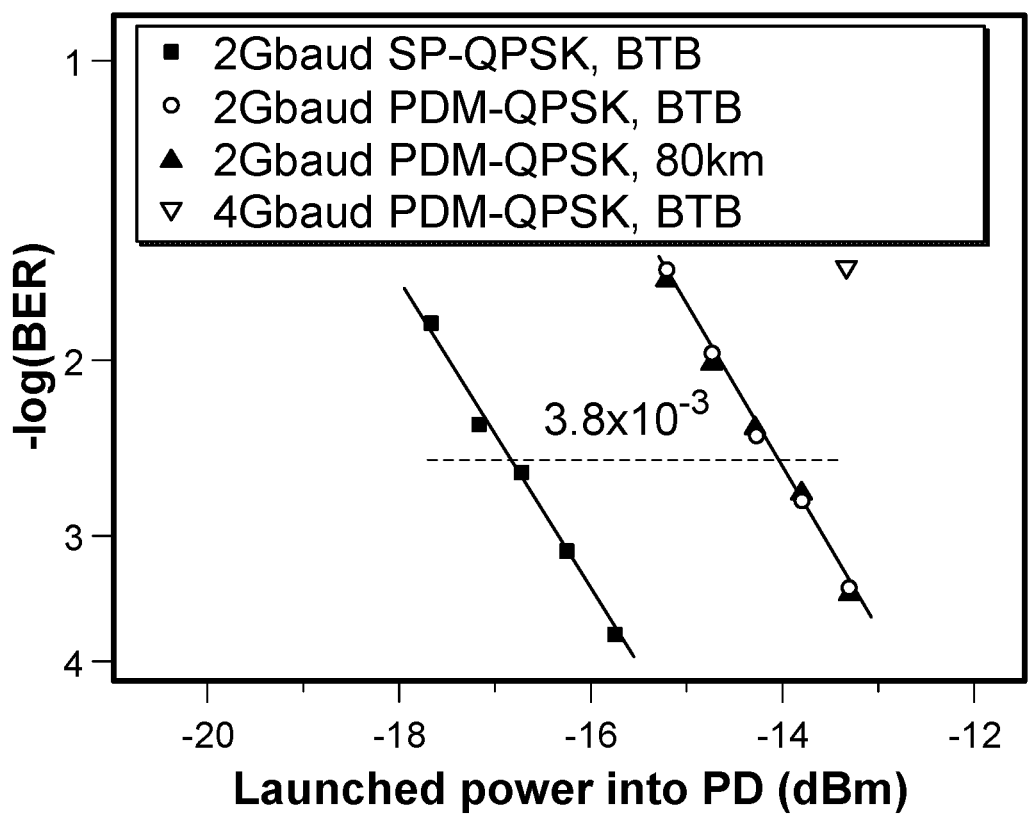
FIG. 12A shows measured BER versus the launched optical power into PD. Received (FIG. 12B) X- and (FIG. 12C) Y-polarization QPSK constellations are shown.
Figure 12B:
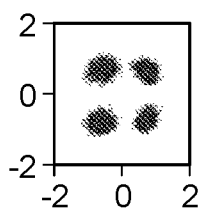
Figure 12C:
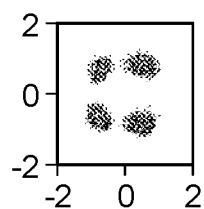

FIG. 12A shows the measured BER versus the launched optical power into PD for four different cases, i.e., 2-Gbaud BTB SP-QPSK, 2-Gbaud BTB PDM-QPSK, 2-Gbaud PDM-QPSK after 80-km SMF-28 transmission and 4-Gbaud BTB PDM-QPSK, respectively. We can see that 80-km SMF-28 transmission causes no power penalty for the 2-Gbaud PDM-QPSK case. The 2-Gbaud PDM-QPSK case has a ~3-dB power penalty compared to the 2-Gbaud BTB SP-QPSK case, which is mainly because of the adoption of the additional optical polarization diversity for the 2-Gbaud PDM-QPSK case. The BER can reach the HD-FEC threshold of $3.8 \times 10^{-3}$ for both 2-Gbaud SP- and PDM-QPSK cases. The BER degradation for the 4-Gbaud BTB PDM-QPSK case is mainly due to the limited bandwidth of the adopted digital OSC. FIGS. 12B and 12C show the recovered error-free X- and Y-polarization QPSK constellations for the 2-Gbaud PDM-QPSK case after 80-km SMF-28 transmission. The corresponding launched optical power into PD is −12 dBm.

It will be appreciated that the generation of PDM-QPSK modulated vector signal adopting MZM-based OCS intensity modulation and direct detection are disclosed. The MZM is driven by a 6-GHz precoded vector signal carrying 2-Gbaud QPSK transmitter data, and biased at its minimum transmission point to realize OCS modulation. The phase of the 6-GHz precoded vector signal is ½ of that of the regular QPSK symbol. The BER for the 2-Gbaud PDM-QPSK modulated vector signal can reach the HD-FEC threshold of $3.8 \times 10^{-3}$ after 80-km SMF-28 transmission in the presence of optical dispersion compensation.

PDM-16QAM Vector Signal Generation and Detection Based on Intensity Modulation and Direct Detection The high speed short reach optical fiber systems are required to satisfy the ever increasing bandwidth demands in recent years. It is well known that intensity modulation and direction detection (IM-DD) is more practical for short reach optical fiber systems than coherent detection in terms of cost and complexity. Meanwhile, advanced vector signal modulation combined with digital signal processing (DSP), for which data information is encoded into both in-phase (I) and quadrature (Q) components of a carrier, has gained increasing interest from the research community as a method to efficiently improve receiver sensitivity and system spectral efficiency. Particularly, higher-level 16QAM vector signal modulation has a higher spectral efficiency, and can decrease transmission baud rate and greatly increase transmission capacity. Moreover, the optical polarization multiplexing technique is a practical solution for the future spectrally-efficient high-speed optical transmission to double the capacity of a fiber link. The commonly used method for PDM-16QAM vector signal generation is based on I/Q modulation and coherent detection, which is very complicated and expensive for short reach optical fiber systems. Some prior art techniques use a relatively simple method to generate PDM-16QAM vector signal based on directly modulated laser and direct detection. However, this method is polarization sensitive, and a polarization tracking system is needed at the receiver to realize polarization de-multiplexing.

In this paper, we experimentally demonstrate a novel and simple method to generate and detect high speed PDM-16QAM vector signal enabled by MZM-based optical-carrier-suppression (OCS) intensity modulation and direct detection. Due to the adoption of OCS intensity modulation, carrier beating can be avoided at the receiver, and thus polarization de-multiplexing can be implemented by DSP-based cascaded multi-modulus algorithm (CMMA) equalization instead of a polarization tracking system. The change of both amplitude and phase information due to the adoption of OCS modulation can be equalized by DSP-based amplitude and phase precoding at the transmitter. Up to 64-Gb/s PDM-16QAM vector signal is generated and detected after 2-km single-mode fiber-28 (SMF-28) or 20-km large-effective-area fiber (LEAF) transmission with a BER less than the HD-FEC threshold of $3.8 \times 10^{-3}$.

Figure 13:
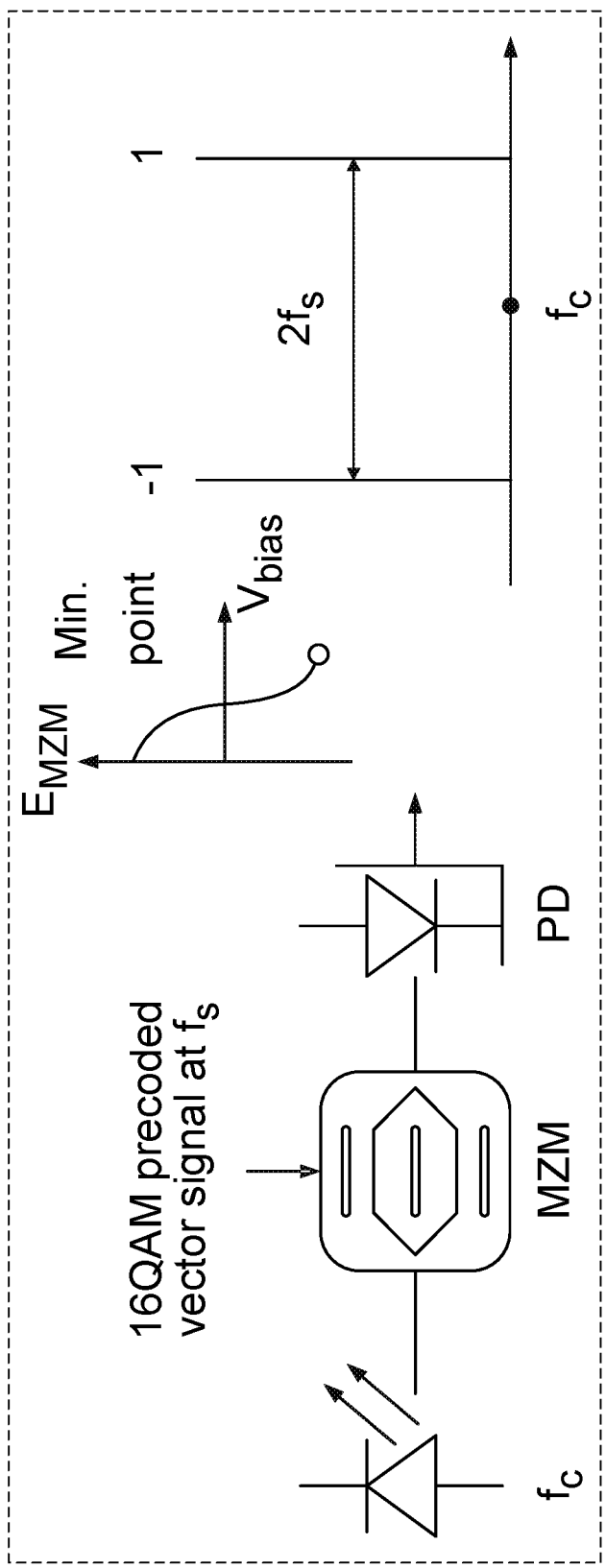
FIG. 13 shows the principle of an example of 16QAM vector signal generation, using OCS intensity modulation and direct detection.

FIG. 13 shows an example of 16QAM vector signal generation, using OCS intensity modulation and direct detection. The continuous wave (CW) output, at frequency $f_c$, from a laser, is modulated by an RF carrier at frequency $f_s$, which carries a precoded 16QAM data and drives the MZM. Assume that the CW output at frequency $f_c$ and the driving RF signal at frequency $f_s$ can be respectively expressed as $$E_{CW}(t) = K_1 \exp(j2\pi f_c t). \qquad \text{Eq. (6)}$$

$$E_{RF}(t) = K_2(t) \sin[2\pi f_s t + \varphi(t)]. \qquad \text{Eq. (7)}$$

where $K_1$ is constant and denotes the amplitude of the CW output at frequency $f_c$. $K_2$ and $\varphi$ denote the amplitude and phase of the driving RF signal at frequency $f_s$, respectively. $K_2$ has three different values corresponding to the three different amplitudes of the precoded 16QAM data. Thus, when the MZM is biased at its minimum transmission point to realize OCS modulation, its output can be expressed as $$E_{MZM}(t) \approx 2jK_1\{J_{-1}(\kappa)\exp[j2\pi(f_c-f_s)t-j\varphi(t)] + J_{+1}(\kappa)\exp[j2\pi(f_c+f_s)t+j\varphi(t)]\}. \qquad \text{Eq. (8)}$$

where $J_n$ is the Bessel function of the first kind and order n. $\kappa$ is equal to $\pi V_{drive} K_2(t)/V_\pi$, while $V_{drive}$ and $V_\pi$ denote driving voltage and half-wave voltage of the MZM, respectively. We can see from Eq. (8) that two first-order subcarriers spaced by $2f_s$ are generated by the MZM, as shown by the inset of FIG. 13.

When the two generated first-order subcarriers are heterodyne mixed in a photodiode (PD), the leading term of the generated RF current after the PD is given by $$i_{RF}(t) = \tfrac{1}{2} R J_1^2(\kappa) \cos[2\pi \cdot 2f_s t + 2\varphi(t)]. \qquad \text{Eq. (9)}$$

where R denotes PD sensitivity. We can see from Eq. (9) that the frequency $2f_s$ of the obtained RF signal is double of the driving RF signal ($f_s$). Therefore, we can realize photonic frequency doubling of the driving RF signal based on our proposed scheme, which, in the meantime, can reduce the bandwidth requirement for photonic and electronic components at the transmitter end. However, it is realized that in our proposed scheme, after square-law PD conversion, frequency doubling also simultaneously leads to phase doubling. Moreover, the amplitude information of the driving RF signal is carried by the term of the square of $J_1(\kappa)$, which depends on the ratio of $V_{drive}$ to $V_\pi$. In order to directly attain the amplitude information and phase information of the transmitter 16QAM data after PD conversion, the amplitude $K_2$ and phase $\varphi$ of the driving RF signal should satisfy $$K_{16QAM} = J_1^2(\pi K_2 V_{drive}/V_\pi); \varphi_{16QAM} = 2\varphi. \qquad \text{Eq. (10)}$$

where $K_{16QAM}$ and $\varphi_{16QAM}$ denote the amplitude and phase of the regular 16QAM symbol, respectively. That is, the obtained values of $K_2$ and $\varphi$ by resolving Eq. (10) are just the precoded amplitude and phase which can be assigned to the driving RF signal.

Experimental Setup and Results

Figure 14B:
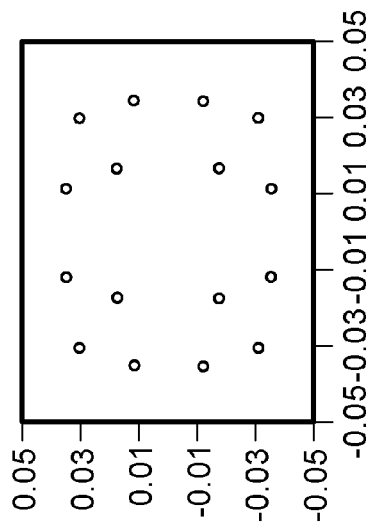
FIGS. 14A-14E show an experimental setup. Transmitter constellations after (FIG. 14A) 16QAM mapping, (FIG. 14B) amplitude precoding, and (FIG. 14C) phase precoding.
Figure 14D:
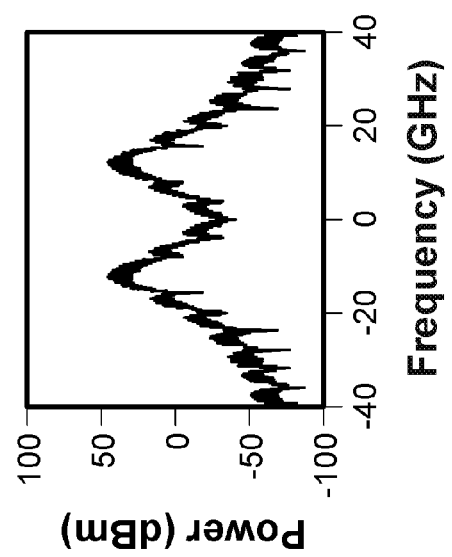
Figure 14A:
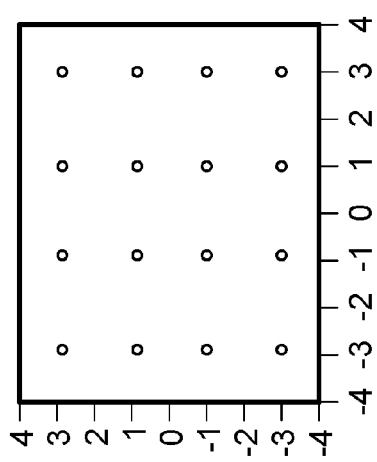
Figure 14C:
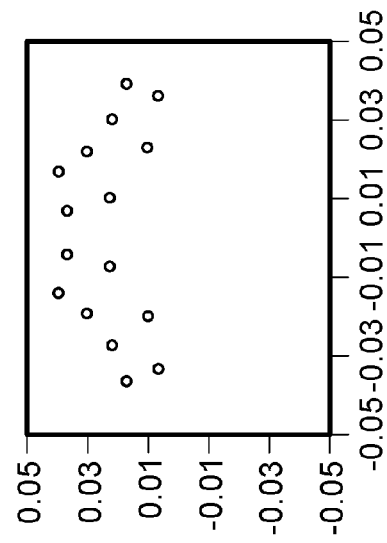
Figure 14E:
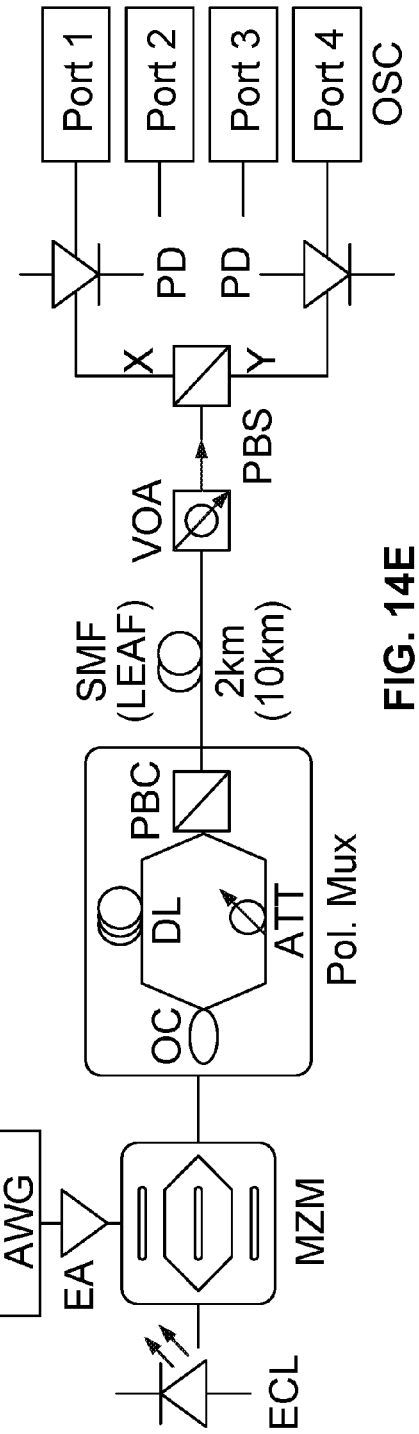

FIGS. 14A-14E show the experimental setup for up to 64-Gb/s PDM-16QAM vector signal generation and detection adopting MZM-based OCS intensity modulation and direct detection. At the transmitter, a precoded vector signal at 12 GHz, carrying 8-Gbaud 16QAM data, is generated by MATLAB programming. That is, a PRBS, with a length of $2^{11}$, is first 16QAM mapped, then both amplitude- and phase-precoded, and finally up-converted into 12-GHz RF band by simultaneous cosine and sine functions. FIGS. 14A, 14B and 14C show the calculated constellations after 16QAM mapping, amplitude precoding and phase precoding, respectively. Here, according to the discussion in the principle part, the amplitude of FIG. 14B is jointly determined by the amplitude of FIG. 14A and the ratio of driving voltage to half-wave voltage of the adopted MZM in our experiment, while the phase of FIG. 14C is precoded as ½ of that of FIG. 14A to overcome the phase doubling effect accompanying frequency doubling after square-law PD detection. FIG. 14D gives the calculated 12-GHz precoded vector signal spectrum after up-conversion. Then, the generated 12-GHz precoded vector signal by MATLAB programming is uploaded into an arbitrary waveform generator (AWG) with 64-GSa/s sampling rate and 13-GHz electrical bandwidth to implement digital-to-analog conversion (DAC).

Next, after boosted by an electrical amplifier (EA) to ~6$V_{pp}$, the 12-GHz precoded vector signal is used to modulate the CW output from an external cavity laser (ECL) via a MZM. The EA (SHF 107 CP) has 25-GHz electrical bandwidth and 20-dBm saturation output power. The MZM has a 3-dB bandwidth of ~36 GHz, 2.8-V half-wave voltage ($V_\pi$) at 1 GHz and 5-dB insertion loss. The MZM is biased at its minimum transmission point to realize OCS modulation.

Figure 15:
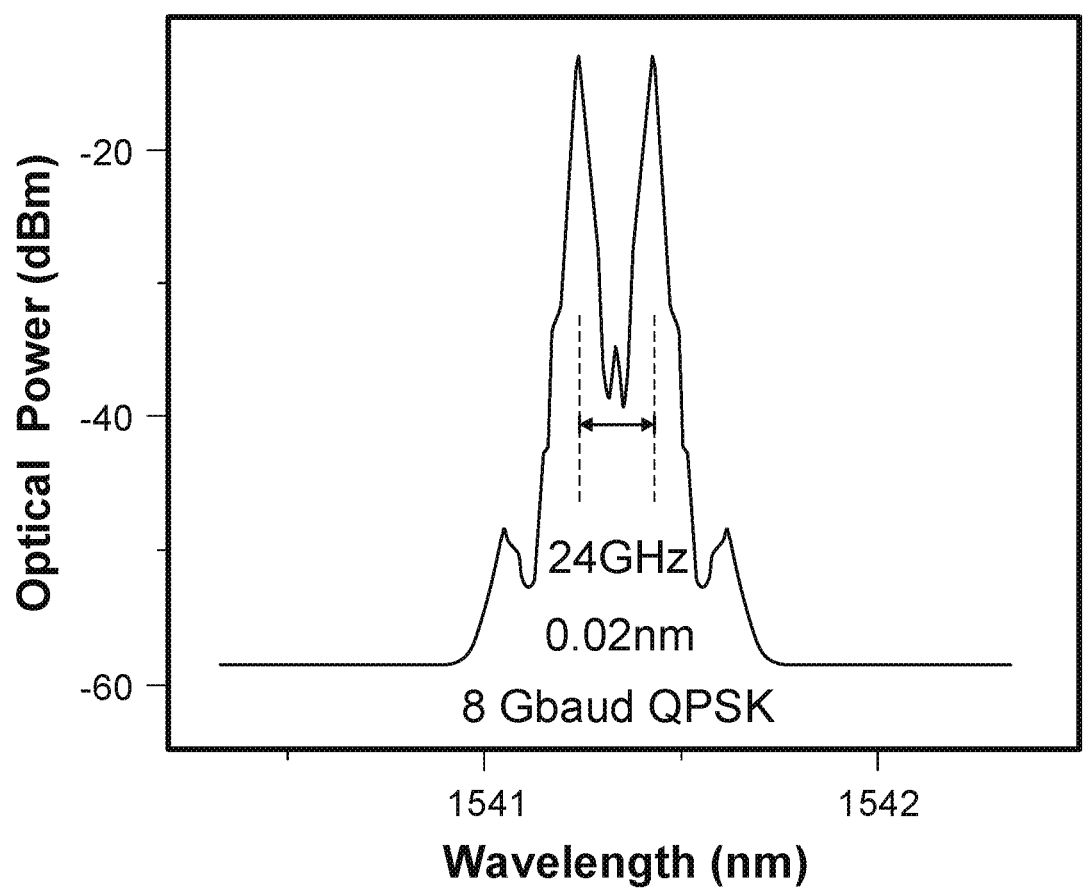
FIG. 15 shows optical spectrum (0.02-nm resolution) after MZM.

FIG. 15 shows the output optical spectrum (0.02-nm resolution) of the MZM. We can see that two first-order optical subcarriers are generated with 24-GHz frequency spacing after OCS modulation. These two generated first-order optical subcarriers have the same amplitude but carry opposite phase information. Polarization multiplexing is further implemented by a polarization multiplexer, which includes a polarization-maintaining optical coupler (PM-OC) to split the signal into two components, a variable optical delay line to provide a delay of 90 symbols, a variable optical attenuator (VOA) to balance the power of the two components and a polarization beam combiner (PBC) to recombine the two components. Then, the generated signal is sent into 2-km SMF-28 or 20-km LEAF. The SMF-28 has 2-dB insertion loss and 17-ps/km/nm chromatic dispersion (CD) at 1550 nm. The LEAF has 5-dB insertion loss and ~5-ps/km/nm CD at 1550 nm. A VOA is added to adjust the optical power for BER measurement.

At the receiver, a PBS is used to implement optical polarization diversity of the received optical signal. Then, the obtained X- and Y-polarization optical components are up-converted by two parallel PDs into two 24-GHz electrical RF signals, which are simultaneously captured by two analog-to-digital-conversion (ADC) channels of a four-channel digital storage oscilloscope (OSC). The PD has 15-GHz optical bandwidth (3 dB). Each ADC channel of the digital OSC has 160-GSa/s sampling rate and 65-GHz electrical bandwidth. Here, due to the adoption of MAT-LAB-based amplitude- and phase-precoding at the transmitter, the two up-converted 24-GHz electrical RF signals can display regular 16QAM modulation. The transmitter 16QAM data can be recovered from the two captured 24-GHz electrical RF signals after offline DSP, which includes IF down conversion, CMMA equalization, frequency offset estimation, carrier phase estimation, differential decoding and BER counting.

FIGS. 16A-16D show the measured BER versus the launched optical power into PD for 8-Gbaud PDM-16QAM vector signal in the cases of BTB, 2-km SMF-28 transmission and 20-km LEAF transmission, respectively. Compared to the BTB case, 2-km SMF-28 transmission causes no power penalty, while 20-km LEAF transmission causes ~1-dB power penalty at the BER of $3.8 \times 10^{-3}$. The BER can reach $3.8 \times 10^{-3}$ for all the three different cases. FIGS. 16B-16D respectively show the captured 24-GHz X-polarization IF signal, the recovered X-polarization 16QAM constellation, and the recovered Y-polarization 16QAM constellation for 8-Gbaud BTB PDM-16QAM vector signal, with a BER of $3.6 \times 10^{-4}$ and −8.8-dBm launched power into PD.

It will be appreciated that a novel and simple method to generate and detect PDM-16QAM vector signal adopting MZM-based OCS intensity modulation and direct detection as well as transmitter-based precoding techniques is disclosed. The MZM is driven by a 12-GHz precoded vector signal carrying 8-Gbaud 16QAM transmitter data, and biased at its minimum transmission point to realize OCS modulation. The phase of the precoded vector signal is ½ of that of the regular 16QAM symbol, while its amplitude is jointly determined by the amplitude of the regular 16QAM symbol and the ratio of driving voltage to half-wave voltage of the MZM. 64-Gb/s PDM-16QAM vector signal is generated and detected after 2-km SMF-28 or 20-km LEAF transmission with a BER under $3.8 \times 10^{-3}$.

With respect to the description in this document, one of skill in the art would understand that while certain processing blocks are described in terms of the use of pseudorandom test sequences (bit patterns) and the use of oscilloscopes to capture waveforms, this description is only for the benefit of explaining the testing performed by the inventors. In deployed optical products, such functionalities may not be present and may be replaced by, e.g., user and control data for communication and test ports in the reception circuitry.

Figure 2:
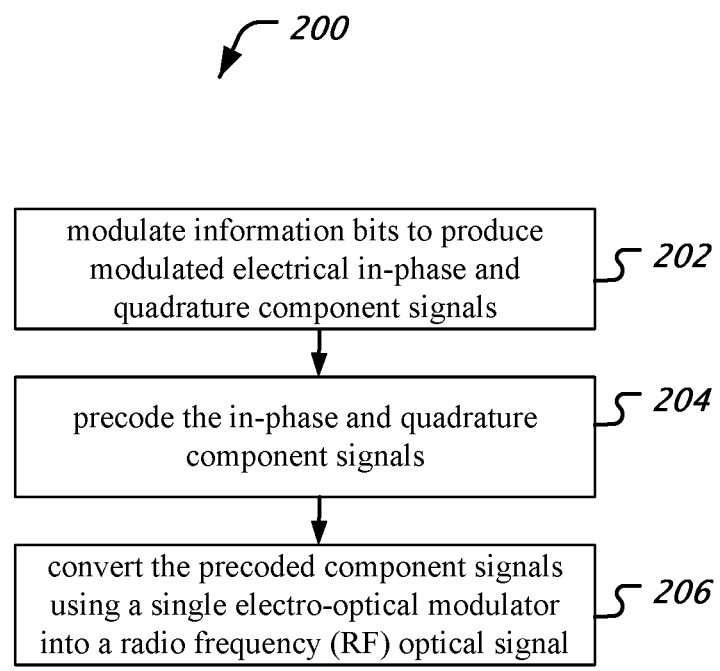
FIG. 2 shows an example optical signal transmission method.

FIG. 2 shows an example flowchart for a method 200 for generating an optical signal.

The method 200 includes, at 202, modulating information bits to be transferred using a multi-amplitude amplitude modulation scheme to produce modulated electrical in-phase and quadrature component signals. In some embodiments, QAM signals with 8 or greater constellations symbols may be used.

The method 200 includes, at 204, precoding the in-phase and quadrature component signals to mitigate distortions in a subsequence electrical to optical conversion stage, wherein the precoding modifies amplitudes of the component signals and phases of the component signals. In some embodiments, the distortion may be modeled as a Bessel function and the precoding may be used to mitigate the distortion by precoding using an inverse function.

The method 200 includes, at 206, converting the precoded component signals using a single electro-optical modulator into a radio frequency (RF) optical signal comprising two component optical signals at two different subcarrier frequencies and with a suppressed carrier signal. In some embodiments, the electro-optical modulator is of a Mach- Zehnder modulator (MZM) type. In some embodiments, the electro-optical modulator is an external electro-optical modulator.

Figure 3:
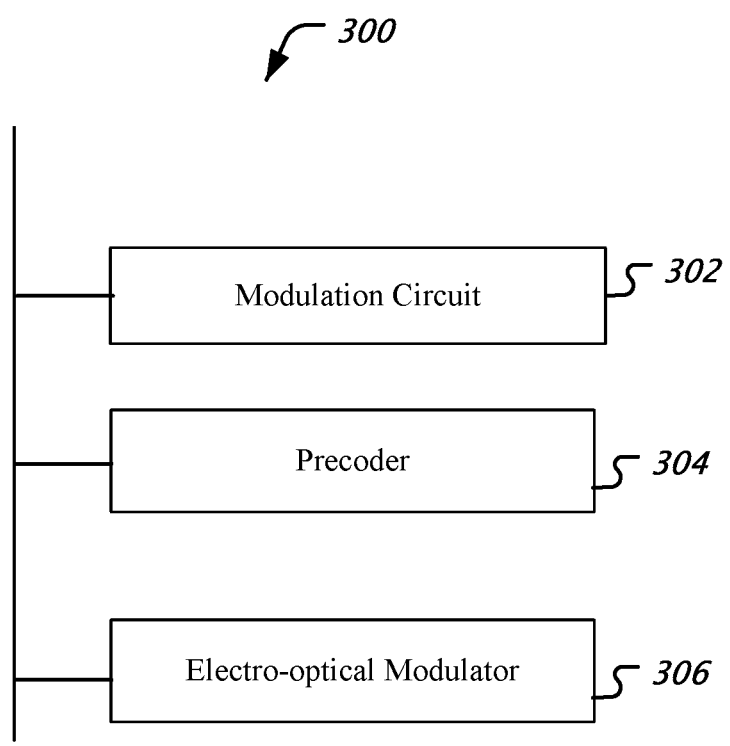
FIG. 3 shows an example optical communication receiver apparatus.

FIG. 3 shows an example optical transmission apparatus 300. The apparatus 300 includes a module 302 (e.g., a modulation circuit that uses high speed transistor circuits) for modulating information bits to be transferred using a multi-amplitude amplitude modulation scheme to produce modulated electrical in-phase and quadrature component signals. The apparatus 300 includes a module 304 (e.g., a precoder) for precoding the in-phase and quadrature component signals to mitigate distortions in a subsequence electrical to optical conversion stage, wherein the precoding modifies amplitudes of the component signals and phases of the component signals. The precoder may be implemented either in software by executing instructions from a DSP, or may be implemented in hardware by using semiconductor circuitry. The precoder may perform operations such as sample filtering and/or scaling on a sample by sample basis. The apparatus 300 includes a module 306 (e.g., an electro-optical modulation stage) for converting the precoded component signals using a single electro-optical modulator into a radio frequency (RF) optical signal comprising two component optical signals at two different subcarrier frequencies and with a suppressed carrier signal. Various embodiments and functions performed by the apparatus 300 and modules 302, 304 and 306 are described in the present document.

In some embodiments, a method of receiving a single polarization or dual polarization optical vector signal at an optical receiver includes performing direct detection of the optical signal to generate sampled digital data in electrical domain and demodulating the sampled digital data to recover information bits used to generate the optical signal using a technique recited in any of the techniques described with respect to method 200. In some embodiments, the operation of direct detection uses two photon detectors after a polarization beam splitter when the optical signal is dual polarization optical vector signal.

In some embodiments, an optical signal receiver apparatus for of receiving a dual polarization optical vector signal includes two polarization detectors for performing direct detection of the optical signal to generate sampled digital data in electrical domain after using a polarization beam splitter to randomly separate polarization of the signals, a memory for storing instructions, and a digital signal processor for reading instructions from the memory and implementing a method of demodulating the sampled digital data to recover information bits used to generate the optical signal using a technique described with respect to method 200.

It will be appreciated that several techniques have been disclosed herein for optical signals generation based on vector modulator using a single external modulator which may be an MZM modulator.

The disclosed and other embodiments and the functional operations and modules described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of optical communication, implemented at a transmitter in an optical communication network, comprising:
    modulating information bits to be transferred using a multi-amplitude amplitude modulation scheme to produce modulated electrical in-phase and quadrature component signals;
    mitigating distortions in a subsequence electrical to optical conversion stage by precoding the in-phase and quadrature component signals, wherein the precoding modifies both amplitudes and phases of the component signals to attain a multi-amplitude vector modulation and modifies only phases of the component signals to attain a constant-amplitude modulation; and
    converting the precoded component signals using a single electro-optical modulator into a radio frequency (RF) optical signal comprising two component optical signals at two different subcarrier frequencies and with a suppressed carrier signal.

2. The method of claim 1, wherein the electro-optical modulator is of a Mach-Zehnder modulator (MZM) type.

3. The method of claim 2, wherein the MZM electro-optical modulator is operated at a minimum transmission point.

4. The method of claim 2, wherein the MZM electro-optical modulator includes an MZM intensity modulator.

5. The method of claim 1, wherein the electro-optical modulator is an external electro-optical modulator.

6. The method of claim 1, wherein the multi-amplitude amplitude modulation scheme uses a quadrature amplitude modulation (QAM) constellation of size 8 or higher.

7. The method of claim 1, wherein the precoding comprises precoding amplitudes to mitigate distortions modeled as Bessel functions.

8. The method of claim 1, further including using an external cavity laser to input an optical carrier signal to the single electro-optical modulator.

9. An optical transmission apparatus, comprising:
    a modulation circuit that modulates information bits to be transferred using a multi-amplitude amplitude modulation scheme to produce modulated electrical in-phase and quadrature component signals;
    a precoder that mitigates distortions in a subsequence electrical to optical conversion stage by precoding the in-phase and quadrature component signals, wherein the precoding modifies both amplitudes and phases of the component signals to attain a multi-amplitude vector modulation and modifies only phases of the component signals to attain a constant-amplitude modulation; and
    an electro-optical modulation stage that converts the precoded component signals using a single electro-optical modulator into a radio frequency (RF) optical signal comprising two component optical signals at two different subcarrier frequencies and with a suppressed carrier signal.

10. The apparatus of claim 9, wherein the electro-optical modulator is of a Mach-Zehnder modulator (MZM) type.

11. The apparatus of claim 10, wherein the MZM electro-optical modulator is operated at a minimum transmission point.

12. The apparatus of claim 10, wherein the MZM electro-optical modulator includes an MZM intensity modulator.

13. The apparatus of claim 9, wherein the electro-optical modulator is an external electro-optical modulator.

14. The apparatus of claim 9, wherein the multi-amplitude amplitude modulation scheme uses a quadrature amplitude modulation (QAM) constellation of size 8 or higher.

15. The apparatus of claim 9, wherein the precoding comprises precoding amplitudes to mitigate distortions modeled as Bessel functions.

16. The apparatus of claim 9, further including using an external cavity laser to input an optical carrier signal to the single electro-optical modulator.

17. A method of receiving a single polarization or dual polarization optical vector signal at an optical receiver, by:
    performing direct detection of the optical signal to generate sampled digital data in electrical domain; and
    demodulating the sampled digital data to recover information bits used to generate the optical signal;
    wherein the optical signal is generated from the information bits by modulating information bits to be transferred using a multi-amplitude amplitude modulation scheme to produce modulated electrical in-phase and quadrature component signals; mitigating distortions in a subsequence electrical to optical conversion stage by precoding the in-phase and quadrature component signals, wherein the precoding modifies both amplitudes and phases of the component signals to attain a multi-amplitude vector modulation and modifies only phases of the component signals to attain a constant-amplitude modulation; and converting the precoded component signals using a single electro-optical modulator into a radio frequency (RF) optical signal comprising two component optical signals at two different subcarrier frequencies and with a suppressed carrier signal.

18. The method of claim 17, wherein the operation of direct detection uses two photon detectors after a polarization beam splitter when the optical signal is dual polarization optical vector signal.

19. An optical signal receiver apparatus for of receiving a single polarization or dual polarization optical vector signal, comprising:
    one or two photon detectors for performing direct detection of the optical signal to generate sampled digital data in electrical domain after using a polarization beam splitter to randomly separate polarization of the signals;
    a memory for storing instructions, and
    a digital signal processor for reading instructions from the memory and implementing a method of demodulating the sampled digital data to recover information bits used to generate the optical signal;

wherein the optical signal is generated from the information bits by modulating information bits to be transferred using a multi-amplitude amplitude modulation scheme to produce modulated electrical in-phase and quadrature component signals; mitigating distortions in a subsequence electrical to optical conversion stage by precoding the in-phase and quadrature component signals, wherein the precoding modifies both amplitudes and phases of the component signals to attain a multi-amplitude vector modulation and modifies only phases of the component signals to attain a constant-amplitude modulation; and converting the precoded component signals using a single electro-optical modulator into a radio frequency (RF) optical signal comprising two component optical signals at two different subcarrier frequencies and with a suppressed carrier signal.

* * * * *